United States Patent [19]
Unger

[11] Patent Number: 5,936,450
[45] Date of Patent: Aug. 10, 1999

[54] WAVESHAPING CIRCUIT USING DIGITALLY CONTROLLED WEIGHTED CURRENT SUMMING

[75] Inventor: Nathaniel W. Unger, Santa Clara, Calif.

[73] Assignee: National Semiconductor Corporation, Santa Clara, Calif.

[21] Appl. No.: 08/821,450

[22] Filed: Mar. 21, 1997

[51] Int. Cl.$^6$ .............................. H03K 17/28; H03K 5/19
[52] U.S. Cl. ........................ 327/237; 327/100; 327/355; 341/154
[58] Field of Search ................................... 327/100, 126, 327/361, 156, 158, 237, 355, 129, 352; 341/147, 154

[56] References Cited

U.S. PATENT DOCUMENTS

| | | | |
|---|---|---|---|
| 5,200,712 | 4/1993 | Srivastava | 331/1 A |
| 5,200,751 | 4/1993 | Smith | 341/147 |
| 5,357,145 | 10/1994 | Seagram | 327/158 |
| 5,410,188 | 4/1995 | Segaram | 327/237 |
| 5,663,728 | 9/1997 | Essenwanger | 341/153 |

*Primary Examiner*—Dinh Le
*Attorney, Agent, or Firm*—Limbach & Limbach L.L.P.

[57] ABSTRACT

A waveshaping circuit, which includes a controller and current summing circuitry controlled by the controller. The controller receives a binary data signal and generates a different set of control signals in response to each of at least two bit patterns of the data signal. The current summing circuitry selectively sinks combinations of component currents in response to sequences of the control signal sets to generates an output current signal having a desired waveform. The current summing circuit can be controlled to operate in a two-stage cycle: a first stage generating a first partial current signal whose waveform determines a first portion of the transmit waveform of the output signal, and a second stage generating a second partial current signal whose waveform determines a second portion of such transmit waveform. The first and second partial output current signals can be amplified and one subtracted from the other to generate an output signal whose waveform complies with a twisted-pair specification of the IEEE 802.3 Ethernet Protocol. Preferably, the current summing circuit includes modules, each including high precision switch circuitry which steers a component current from a source to one of multiple output nodes, or from the source to a waste node in response to one or more control signals indicating that no current should be steered to any of the output nodes. Preferably, the controller has synchronous design in the sense that it operates in response to clock signal edges of a single polarity.

32 Claims, 11 Drawing Sheets

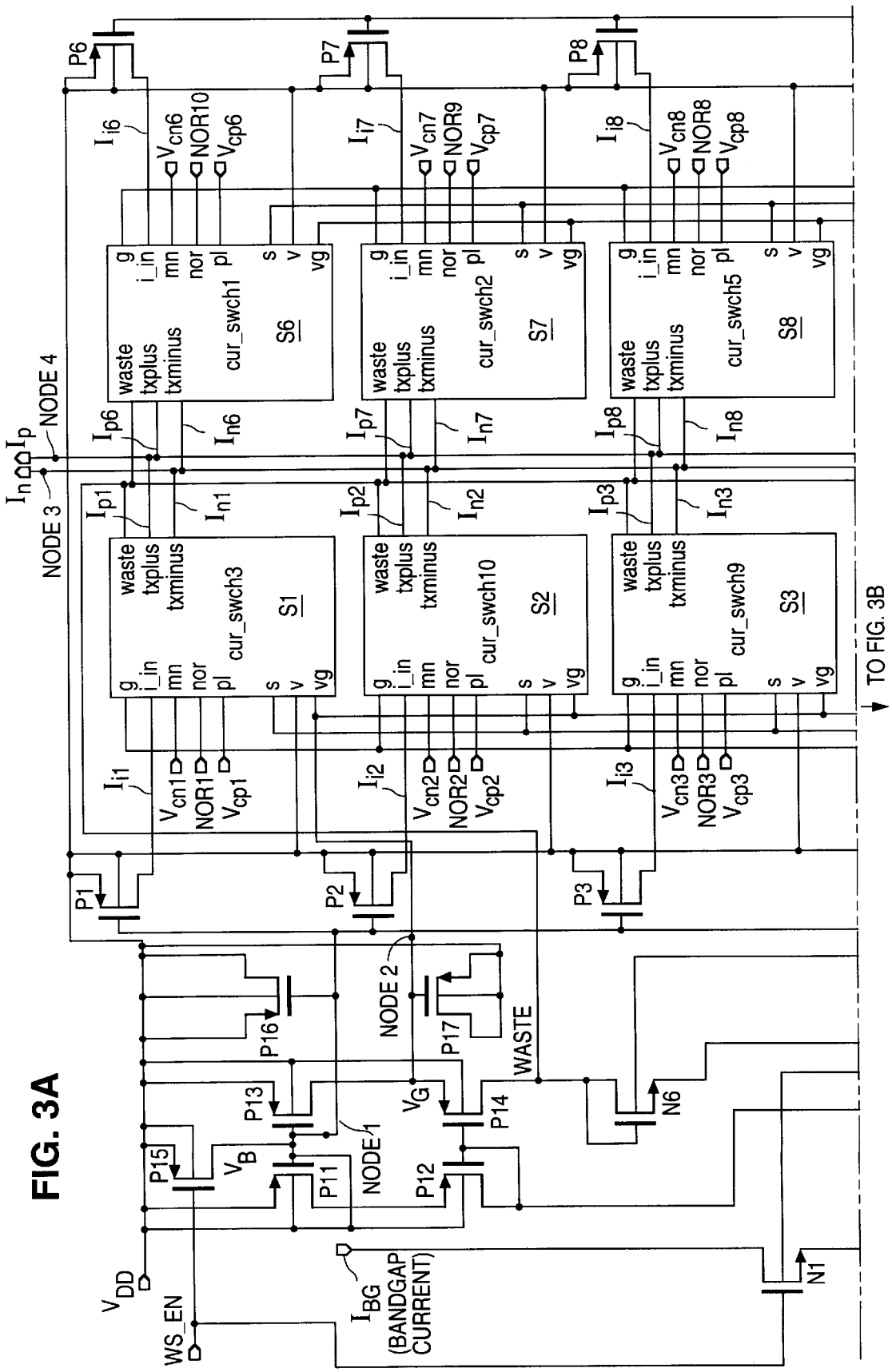

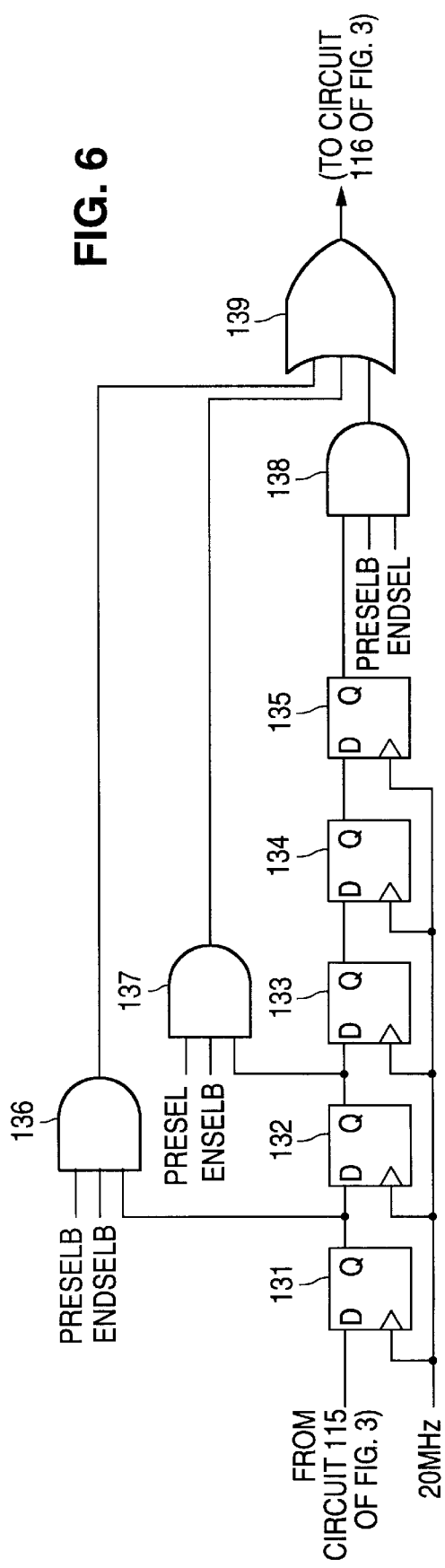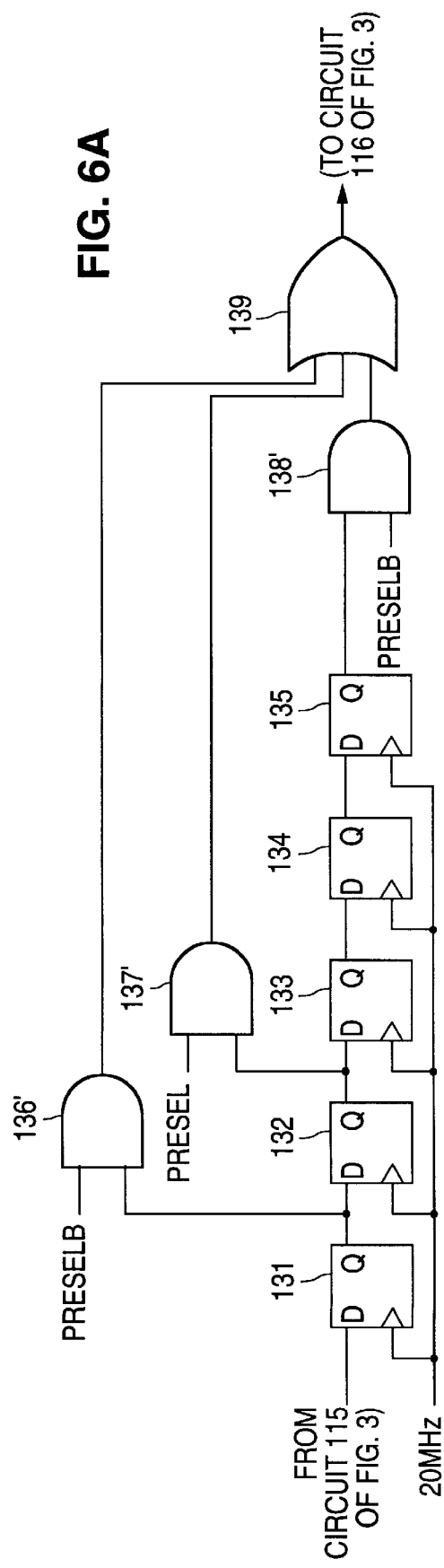

WAVESHAPING CIRCUIT USING DIGITALLY CONTROLLED WEIGHTED CURRENT SUMMING

BACKGROUND OF THE INVENTION

1. Field of the Invention

The present invention relates to waveshaping circuits. More particularly, the invention relates to waveshaping circuits for generating an analog signal, for transmission by a transmission medium (e.g., a twisted-pair cable of the type used in local area networks), in response to a data signal.

2. Description of the Related Art

A local area network is a communication system that allows personal computers, workstations, servers, and other devices within a small area, such as a single building or a group of buildings, to transfer information between each other. Each device connected to the network communicates with other devices on the network in accordance with a standard which defines the operation of the network. One of the most widely accepted standards for local area networks is the IEEE 802.3 Ethernet Protocol.

The IEEE 802.3 Ethernet Protocol defines four physical layer specifications which differ primarily in the physical cables utilized. Systems with coaxial cables are defined by a Thick Coax Ethernet (10BASE5) specification, which assumes a double-shielded coaxial cable, and a Thin Coax Ethernet (10BASE2) specification, which assumes a single-shielded coaxial cable. Systems with twisted pair cables are defined by a Twisted Pair Ethernet (10BASE-T) specification and a StarLAN (1BASE5) specification.

One aspect of a twisted-pair network which is defined by the twisted-pair specification is the transmit waveform for the data signal. A data signal (indicative of Manchester-encoded binary bits) is shaped in accordance with the twisted-pair specification to generate an output signal having the transmit waveform. The output signal has a defined amplitude step for each transition of the data signal from a logic one to a logic zero (or from a logic zero to a logic one), and has attenuated higher harmonic components.

Data is typically processed for transmission on a twisted-pair cable as follows. The data is Manchester-encoded, and a Manchester-encoded data signal (an "input data signal") is generated. The complement of the input data signal (a "complementary input data signal") is typically also generated. A delayed version of the input data signal and delayed version of the complementary input data signal are then generated, respectively, by delaying each of the input data signal and the complementary input data signal by one half period.

Next, the four input data signals (including the delayed input data signal and delayed complementary input data signal) are resistively combined and filtered to form a partial output signal (V+) and a complementary partial output signal (V−). The difference of these two signals, (V+)−(V−), determines the transmitted output signal. The resistive combining and filtering operations shape the waveform of each partial output signal to provide the specified amplitude step and harmonic attenuation for the transmit waveform of the output signal. The output signal (having the transmit output waveform) is generated (and asserted to the twisted-pair cable) by feeding partial output signals V+ and V− to a transformer connected to the twisted-pair cable.

A commonly utilized circuit for performing the described output signal generation steps (including the step of resistively combining and filtering the four input data signals) includes a transmission stage, a summing resistor network, and a filter, as well as the mentioned transformer. Such a circuit is described in the background section of U.S. Pat. No. 5,357,145, issued Oct. 18, 1994 (and assigned to the assignee of the present invention). The transmission stage, which is typically packaged as an integrated circuit, asserts the four input data signals as square-wave current signals to a summing resistor network that is external to the integrated circuit.

The external summing resistor network generates both a square-wave transmit voltage signal TXO+ and a square-wave complementary transmit voltage signal TXO− by summing together the voltages generated by driving the input data signal and complementary delayed input data signal across different resistors, and by summing together the voltages generated by driving the complementary input data signal and delayed input data signal across a different set of resistors.

The filter, which is typically implemented as a conventional low-pass L-C filter external to the transmission stage, generates output data signal V+ and complementary output data signal V− by attenuating harmonic components of both square-wave transmit voltage signal TXO+ and square-wave complementary transmit voltage signal TXO−.

Output data signal V+ and complementary output data signal V− are then asserted to opposite ends of the primary of the transformer (typically an external 2:1 transformer), so that the voltage (V+)−(V−) is applied across the primary. The transformer isolates the described transmission stage, external summing resistor network, and external filter from the twisted-pair cable. The voltage across the secondary of the transformer is the output signal, having a transmit waveform conforming to the twisted-pair specification, which is transmitted on the cable.

One problem with using a conventional waveshaping circuit of the type described is that the harmonic components of the four square-wave input data signals are not attenuated in the transmission stage (only the subsequently generated signals TXO+ and TXO− are attenuated in the filter), and thus the four square-wave input signals radiate a significant amount of harmonic switching noise as a result of the high current levels utilized by the transmission stage to drive the four square-wave signals onto the summing resistor network. The magnitude of the switching noise prevents typical implementations of the circuit from satisfying FCC requirements for radiated emissions.

Another problem with utilizing a conventional waveshaping circuit of the described type is that an external resistor summing network and external filter (in addition to the transmission stage) consume a substantial area on a circuit board.

U.S. Pat. No. 5,357,145 describes an integrated waveshaping circuit for generating an output signal for transmission on a twisted-pair cable in response to an oscillator signal, a Manchester-encoded input data signal, and a delayed version of the Manchester-encoded input data signal. This integrated circuit (of which FIG. 1 of the present specification is a block diagram) eliminates or significantly reduces harmonic switching noise radiated during generation of the output signal and requires less circuit board space.

In the integrated waveshaping circuit of U.S. Pat. No. 5,357,145 (shown in FIG. 1 of the present specification), a Manchester-encoded data signal (the input data signal "DATA") and a delayed version thereof (the input data signal "DELAYED DATA") are supplied respectively to input logic stage 14 and input logic stage 16. The signal DELAYED DATA is delayed by one half period with respect to signal DATA.

The FIG. 1 circuit generates partial output data signal V+ and complementary partial output data signal V− in response to the input signal DATA and the delayed input signal DELAYED DATA. The output signal produced by applying signals V+ and V− across the primary of a transformer (which is coupled to a twisted pair cable) has a transmit waveform which conforms to the twisted pair (10BASE-T) specification of the IEEE 802.3 local area network standard.

The waveshaping circuit of FIG. 1 includes phase-lock loop stage 12 which generates a series of incrementally-delayed timing signals TS1–TSn in response to an externally provided oscillator signal OSC, input logic stage 14 which generates a series of pairs of complementary logic signals Q1/NQ1, Q2/NQ2, . . . , Qn/NQn in response to the timing signals TS1–TSn and input data signal DATA, delayed input logic stage 16 which generates a series of pairs of complementary delayed logic signals Qd1/NQd1, Qd2/NQd2, . . . , Qdn/NQdn in response to the timing signals TS1–TSn and delayed input data signal TXd+, and weighted current sum stage 18. Weighted current sum stage generates partial output data signal V+ and complementary partial output data signal V− in response to the pairs of complementary logic signals Q1/NQ1–Qn/NQn and the pairs of complementary delayed logic signals Qd1/NQd1–Qdn/NQdn.

Phase-lock loop ("PLL") stage 12 includes a set of "n" inverters connected in series (where "n" is an integer) which generates the series of incrementally-delayed timing signals TS1–TSn (square-wave clock signals) in response to the oscillator signal OSC and a control voltage. Oscillator signal OSC is typically a 10 MHz (megahertz) signal, where DATA is a 10 MHz signal. Each of the inverters outputs a different one of signals TS1–TSn, and each inverter introduces approximately the same propagation delay (time delay Td) to the output of the preceding inverter. Each of logic circuits 14 and 16 is clocked by the rising edge of the first timing signal TS1 and each succeeding odd-numbered timing signal, and by the falling edge of the second timing signal TS2 and each succeeding even-numbered timing signal (or by the falling edge of each odd-numbered timing signal, and the rising edge of each even-numbered timing signal). Thus, due to the errors which typically occur in the duty cycle of each clock signal output by conventional PLL circuitry (which will typically be used to implement PLL circuit 12), circuits 14 and 16 are subject to timing errors which result from jitter between rising and falling edges of signals TS1–TSn (and changes over time in the timing of rising edges of signals TS1–TSn relative to falling edges of signals TS1–TSn).

With reference again to FIG. 1, weighted current sum circuit 18 generates partial output signal V+ and complementary partial output signal V− in response to input data signal DATA (and delayed input data signal DELAYED DATA) in accordance with the twisted-pair specification of the IEEE 802.3 local area network standard. In the twisted-pair specification, input data signal DATA is defined as a 10 MHz (megahertz) Manchester-encoded signal (although it can include portions having frequency 5 MHz, as well as bits indicative of an "end of a packet" of 10 MHz and/or 5 MHz data). The DELAYED DATA signal is the DATA signal delayed by one-half period of a 10 MHz signal (i.e., the DATA signal delayed by 50 nanoseconds).

As noted, input logic stage 14 of the FIG. 1 system generates a series of pairs of complementary logic signals Q1/NQ1–Qn/NQn in response to timing signals TS1–TSn and input data signal DATA. Each of timing signals TS1–TSn controls generation of a corresponding pair of the complementary logic signals by periodically latching input data signal DATA (so that each pair of complementary logic signals comprises at least approximately a delayed version of signal DATA and the inverse of such delayed version of signal DATA).

More specifically, logic stage 14 comprises a series of "n" logic blocks, where the "j"th logic block corresponds to the "j"th inverter gate within PLL circuit 12 (where j is an integer in the range from 1 through "n"). The "j"th logic block generates the "j"th transmit logic signal Qj and the "j"th complementary transmit logic signal NQj in response to input data signal DATA and the "j"th timing signal TSj. The logic blocks within circuit 14 are configured so that each of the logic signals Q1–Qn has a waveform at least substantially equal (subject to error) to that of input data signal DATA, delayed by an amount determined by the relevant one of timing signals TS1–TSn (the one of signals TS1–TSn received by the relevant logic block). Thus, for example, if the logic state of input data signal DATA is high when timing signal TS1 transitions either from a logic low to a logic high or from a logic low to a logic high, the logic state of first logic signal Q1 will also be high. Each of the logic blocks also outputs a different one of the complementary logic signals NQ1–NQn (which are the inverses of signals Q1–Qn) in response to the relevant one of timing signals TS1–TSn.

In operation, since oscillator signal OSC is synchronized to input data signal DATA, when the logic state of input data signal DATA transitions from a logic low to a logic high, the logic state of first timing signal TS1 will transition from a logic high to a logic low, and first logic signal Q1 will transition from a logic low to a logic high after a delay principally introduced by the inverter within PLL circuit 12 which outputs timing signal TS1. Similarly, the logic states of second timing signal TS2 and second logic signal Q2 will transition from a logic low to a logic high after a delay principally introduced by the first two inverters within PLL circuit 12 (the second inverter outputs timing signal TS2).

Still with reference to FIG. 1, delayed input logic stage 16 can have identical structure to that of logic stage 14. Each of the logic blocks within logic stage 16 receives the delayed input signal (DELAYED DATA) and outputs a different one of the pairs of complementary delayed logic signals Qd1/NQd1–Qdn/NQdn in response to a corresponding one of timing signals TS1–TSn.

Since the delayed input data signal DELAYED DATA is delayed one-half period from the input data signal DATA, when the logic state of the input data signal DATA transitions from a logic low to a logic high, each delayed input logic signal Qd1–Qdn will transition to a logic high (and each complementary delayed transmit logic signal NQd1–NQdn will transition to a logic low) after the combined delay time equal to the delay time associated with the corresponding inverter within PLL circuit 12 (the inverter which produces the corresponding one of timing signals TS1–TSn) plus the one-half period delay.

Still with reference to FIG. 1, weighted current sum stage 18 generates partial output signal V+ and complementary partial output signal V− as follows, in response to all of complementary logic signal pairs Q1/NQ1–Qn/NQn and complementary delayed logic signal pairs Qd1/NQd1–Qdn-NQdn.

The "jth" pair of logic signals Qj/NQj and the corresponding pair of delayed logic signals Qdj/NQdj (where j is an integer in the range from 1 through n) simultaneously generate both an incremental portion of signal V+ and an incremental portion of signal V−. The instantaneous value of signal V+ is determined by summing together all the incremental portions of the output data signal V+ while the instantaneous value of signal V− is determined by summing together all the incremental portions of signal V−. Circuit 18 includes "n" current source circuits, each of which generates a portion of signal V+ (by sinking one of a plurality of incremental data currents Id1–Idn through a resistor, or sinking no current, in response to one of the signals Q1–Qn and one of the signals NQd1–NQdn) and also generates a portion of signal V− (by sinking one of a plurality of incremental Ic1–Icn through another resistor, or sinking no current, in response to one of the signals NQ1–NQn and one of the signals Qd1–Qdn).

There are several limitations and disadvantages of conventional waveshaping circuits (including that of FIG. 1), including the following:

1. they do not adequately limit amplitude swings in their output signals under certain conditions (or cannot adequately limit such amplitude swings without using at least one output capacitor or other low-pass filter which requires transformation of the output signals from current signals to voltage signals);

2. conventional waveshaping circuits such as that of FIG. 1 consume much power in order to achieve sufficiently precise control over the waveforms of their output signals (due to their need to use a large number of current sources for this purpose);

3. conventional waveshaping circuits such as that of FIG. 1 have inadequately synchronous design in the sense that they operate (i.e., generate control signals) in response to clock signals that are subject to errors (such as duty cycle errors which change over time). Thus, the control signals (and the output signals generated in response to the control signals) are subject to timing errors;

4. in response to "end of packet" codes in their input data signals, conventional waveshaping circuits such as that of FIG. 1 typically produce output signals whose waveforms are clamped for some period of time and thus exhibit errors (such as ringing and undershoot errors) at the end of such period; and.

5. although some conventional waveshaping circuits such as that of FIG. 1 can be implemented as integrated circuits, the design of such integrated circuits had been complicated and large in size.

The present invention avoids or eliminates these and other limitations and disadvantages of the prior art. For example, preferred embodiments of the inventive waveshaping circuit:

1. use high precision switches (each of which steers current from a source to one of multiple output nodes) which enable production of output current signals with well-controlled, limited amplitudes without use of capacitors or other low pass filters of the type used in the prior art. Preferably, each high precision switch includes circuitry which sinks current from the source to a "waste" node under certain conditions, where without such circuitry there would be undesirable switching noise at the output nodes under such conditions;

2. consume less power in order to achieve sufficiently precise control over the waveforms of their output current signals (since only a small number of current sources is required to achieve sufficiently precise control);

3. have synchronous design in the sense that they operate (i.e., generate control signals for controlling their current source circuitry) in response to clock signals that are not subject to significant errors (such as duty cycle errors). Thus, they generate control signals that are not subject to significant timing errors (and the output current signals generated in response to the control signals are not subject to corresponding significant errors in their waveforms);

4. in response to "end of packet" codes in the input data signal, produce output signals whose waveforms undergo a gradual transition to zero (and thus do not exhibit significant ringing or undershoot errors); and 5. can be implemented as integrated circuits having simpler design and smaller size than could be attained by prior art waveshaping circuits.

SUMMARY OF THE INVENTION

The waveshaping circuit of the invention includes control circuitry (referred to herein as a "digital controller") which receives an input data signal and generates a different set of control signals in response to each of at least two different bit patterns of the input data signal. The waveshaping circuit also includes current summing circuitry which receives sets of control signals from the digital controller and generates an output current signal having a desired waveform by sinking a current determined by each set of control signals. The current summing circuit includes a number of modules (e.g., ten modules) each of which generates a component of the output current. Preferably, the current summing circuit can be controlled to operate in a two-step (or two-stage) cycle: a first step (or stage) in which the modules generate a first partial current signal whose waveform determines a first portion of the transmit waveform of the output signal, and a second step (or stage) in which the modules generate a second partial current signal whose waveform determines a second portion of such transmit waveform. In the first step, each module sinks a component current in response to a subset of a set of control signals received from the digital controller, and the component currents sum together to produce the first partial current signal. In the second step, each module sinks a component current in response to a subset of another set of control signals received from the digital controller, and these component currents sum together to produce the second partial output current signal. The first and second partial output current signals can be amplified (e.g., in a line driver) and the resulting amplified signals subtracted (one from the other) to generate an output signal whose waveform complies with a twisted-pair specification of the IEEE 802.3 Ethernet Protocol. In response to square wave portions of the input data signal, the first partial output current signal has a 50% duty cycle, the second partial output current signal has a 50% duty cycle 180 degrees out of phase with that of the first partial output current signal, so that one partial output current signal has amplitude equal (or substantially equal) to zero amps during the first step of the cycle and the other partial output current signal has amplitude equal (or substantially equal) to zero amps during the second step of the cycle. The current summing circuit can also be controlled to assert one but not both of the first and second partial output current signals in response to the input data signal (e.g., in response to an "end of packet" code of the input data signal).

Preferably, each module of the current summing circuit includes high precision switch circuitry which steers the component current from a source to one of multiple output nodes (a first output node during the first step of the cycle, and a second output node during the second step of the cycle). Preferably, the switch circuitry sinks current from the source to a "waste" node in response to one or more control signals indicating that no current should be steered to any of the output nodes. The sinking of current to such "waste" node limits undesired current swings in each partial output current signal produced by the current summing circuit.

The digital controller preferably includes two sets of logic circuitry: one for generating control signals for use in the first step of a two step cycle; the other for generating control signals for use in the second step of the cycle. Preferably, each set of logic circuitry comprises a small number of shift registers (e.g., four shift registers) each driven by a different clock signal. Preferably, each clock signal has the same frequency (e.g., 100 MHz, when the input data has a maximum frequency of 10 MHz) but each has a different phase than do the others. Each shift register has multiple stages, each stage implemented by a flip-flop. Preferably, the digital controller also includes logic circuitry which enters a different state in response to each of at least two different bit patterns of the input data signal. The control bits asserted to the current summing circuit depend on the state of the digital controller. For example, the digital controller can enter a different one of three states (and assert a different type of control signal set to the current summing circuit) in response to each of the following bit patterns of the input data: 10 MHz data, "predistortion 5 MHz" data, and "end of packet" code.

Also preferably, in response to an "end of packet" code in the input data, the digital controller asserts control signals of a type which cause the current summing circuit to produce an output current signal whose waveform undergoes a gradual final transition to zero amplitude (and thus does not exhibit significant ringing or undershoot errors).

The inventive waveshaping circuit includes a phase-lock loop (PLL) circuit which operates in response to an oscillator signal to generate each clock signal needed by the digital controller. Preferably, the digital controller has synchronous design in the sense that it operates in response to clock signal edges of a single polarity (e.g., only in response to the falling edges of each clock signal, or only in response to the rising edges of each clock signal). Thus even though the PLL is implemented in a simple, inexpensive manner which may be subject to duty cycle errors (jitter between the rising and falling edges of each clock signal), the digital controller will be unaffected by such duty cycle errors and will assert control signals that are not subject to significant timing errors (so that the current signals generated by the current summing circuit in response to the control signals will not be subject to corresponding significant errors in their waveforms.

The inventive waveshaping circuit can be implemented as a single integrated circuit, or as a portion of a single integrated circuit which also includes other elements (e.g., processing elements for encoding and decoding input data).

The inventive waveshaping circuit is useful for supplying the partial output current signals to a line driver of the type which amplifies a current signal. The output signals generated by the waveshaping circuit are current referenced to ground (in contrast to the output signals generated by some conventional waveshaping circuits which are voltage referenced to ground).

BRIEF DESCRIPTION OF THE DRAWINGS

FIG. 6 is a block diagram of an embodiment of circuit 130 of FIG. 5.

FIG. 6A is a block diagram of the circuit which replaces the FIG. 6 circuit in the "negative" shift register circuit within digital controller circuit 22.

Each of FIGS. 9A, 9C, and 9D is a diagram of a waveform of different portion of output current signal "Ip" produced by current summing circuit 24 of FIG. 2.

DETAILED DESCRIPTION OF THE PREFERRED EMBODIMENTS

Figure 2:
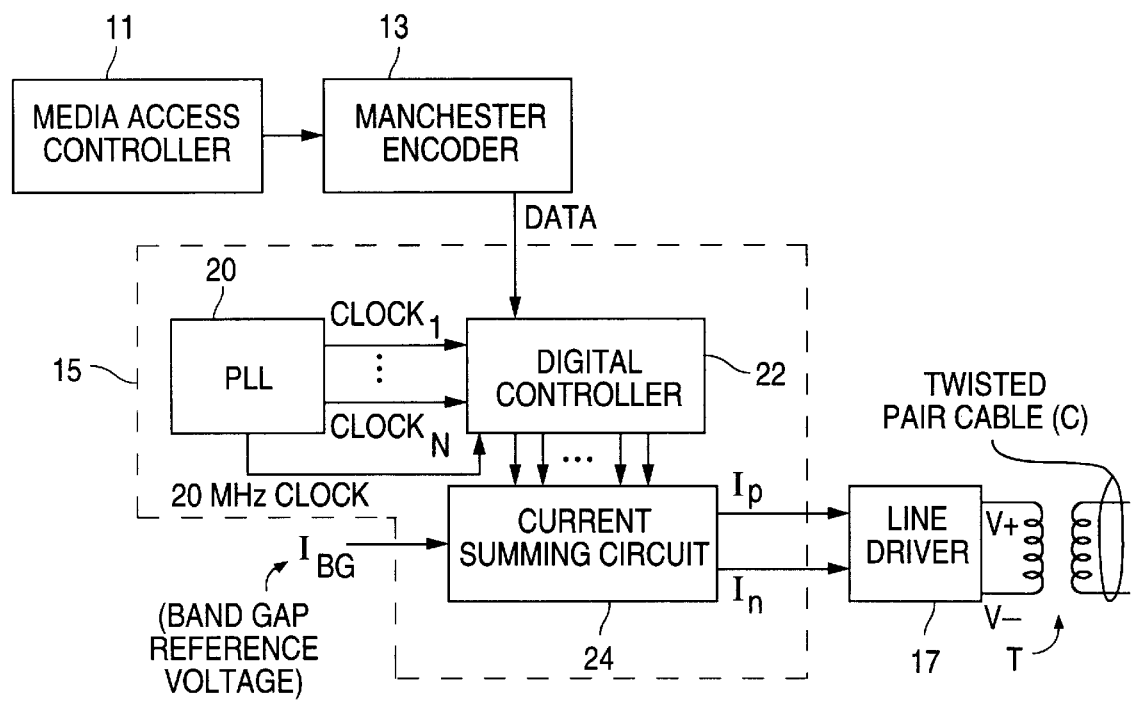
FIG. 2 is a block diagram of a system including a preferred embodiment of the waveshaping circuit of the invention.

Waveshaping circuit 15 of FIG. 2 is a preferred embodiment of the invention. Waveshaping circuit 15 includes phase-lock loop (PLL) circuit 20, digital controller 22, and current summing circuit 24. In the system shown in FIG. 2, media access controller 11 asserts a data signal indicative of a stream of binary data bits to Manchester encoder 13. Manchester encoder 13 encodes the data signal thereby producing a Manchester-encoded data signal, and asserts the Manchester-encoded data signal (data signal "DATA" in FIG. 2) to digital controller 22. In typical implementations, digital controller 22 typically produces an inverted version of the signal DATA and a delayed version of the signal DATA, and signal DATA, its inverse, and the delayed version thereof, are processed in digital controller 22.

Depending on the sequence of logical "zero" and logical "one" bits indicated by the Manchester-encoded data signal DATA, the signal DATA comprises some portions having a frequency F (typically, F=10 MHz) and other portions having frequency F/2. Typically, the signal DATA comprises packets of Manchester-encoded "one" and "zero" bits (with each packet having frequency F during some portions of its duration and frequency F/2 during other portions of its duration), and includes a distinctive "end of packet" code at the end of each packet.

Digital controller 22 includes logic circuitry which generates a different set of control signals in response to each of at least two different bit patterns of signal DATA. For example, in the preferred embodiment to be described below, digital controller 22 generates one control signal set in response to each 10 MHz portion of signal DATA, a second control signal set in response to each 5 MHz portion of signal DATA, and a third control signal set in response to each "end of packet" code indicated by signal DATA. Digital controller 22 asserts each set of control signals it generates to current summing circuit 24.

Current summing circuit 24 receives each set of control signals and generates two current signals (partial output current signals "Ip" and "In") by sinking a sequence of currents determined by each set of control signals. The partial output current signals Ip and In generated in response to a sequence of control signal sets together determine the desired transmit waveform of the output signal based on the signal DATA (with the portions of signals Ip and In generated in response to each control signal set together determining the portion of the transmit waveform which corresponds to the bit pattern of signal DATA indicated by such control signal set). More specifically, the waveform of partial output current signal Ip (generated in response to each control signal set) determines a first segment of the desired transmit waveform corresponding to such control signal set, and the waveform of second partial output current signal In (generated in response to such control signal set) determines a second segment of the transmit waveform corresponding to such control signal set.

Figure 9A:
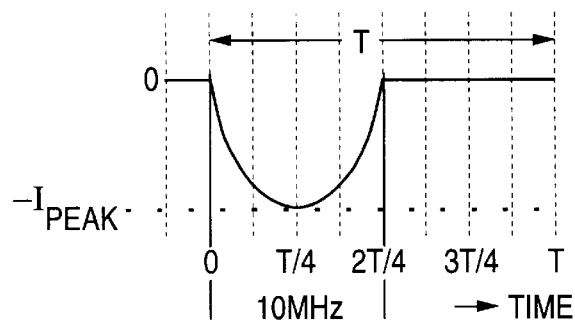
FIG. 9B is a diagram of a waveform of portion of output current signal "In" produced by current summing circuit 24 of FIG. 2.

In response to one cycle of a square wave data signal, the waveform of partial output current signal "Ip" approximates the first half of an inverted sine waveform (said first half having duration T/2, where T is the period of the sine waveform) followed by a zero amplitude waveform of duration T/2 (i.e., the waveform shown in FIG. 9A, commencing at time "0" and ending at time "T"). Also in response to one cycle of the square wave data signal, the waveform of partial output current signal "In" approximates a zero amplitude waveform of duration T/2 followed by the second half (of duration T/2) of a sine waveform (i.e., the waveform shown in FIG. 9B, commencing at time "0" and ending at time "T"). In typical embodiments, such cycle of the square wave data signal has duration 100 nsec (and thus the square wave data signal has frequency 10 MHz).

In line driver circuit 17, the first and second partial output current signals are amplified. An amplified voltage signal produced by amplifying the second partial output current signal (which is asserted at an output of circuit 17) is effectively subtracted from an amplified voltage (asserted at another output of circuit 17) produced by amplifying the first partial output current signal to generate an output signal having the desired transmit waveform and amplitude (e.g., the two amplified voltage signals are applied across the primary of transformer T). In the typical case that the output signal is to be transmitted over a twisted pair cable, its waveform and amplitude comply with a twisted-pair specification of the IEEE 802.3 Ethernet Protocol. The output signal can be used to drive a twisted pair cable (e.g., cable C in FIG. 2) as follows. A potential difference ($V_+-V_-$) whose magnitude and phase is determined by the amplitude and phase of the amplified signals output from circuit 17 is applied across the primary of a transformer (transformer T in FIG. 2). The secondary of the transformer is connected across the twisted pair cable, and the voltage across the secondary is the output signal. The output signal, whose transmit waveform conforms to the twisted-pair specification, is transmitted on the cable.

In preferred embodiments, the first partial output current signal (Ip) has a 50% duty cycle and the second partial output current signal (In) has a 50% duty cycle which is 180 degrees out of phase with that of the first partial output current signal (in response to square wave portions of the signal DATA, e.g., in response to each 10 MHz square wave portion of signal DATA). As will be explained in greater detail below, in these embodiments, current summing circuit 24 usually operates in a two-step cycle comprising: a first step in which it generates the first partial current signal (whose waveform determines a first portion of the transmit waveform of the output signal), and a second step in which it generates the second partial current signal (whose waveform determines a second portion of such transmit waveform). One of the partial output current signals has amplitude equal (or substantially equal) to zero amps during the first step and the other of the partial output current signals has amplitude equal (or substantially equal) to zero amps during the second step. In preferred embodiments, the peak amplitude of each partial output current signal ($-I_{PEAK}$ in FIGS. 9A–9D) is –250 microamps, and the peak-to-peak amplitude of the output signal applied across the twisted pair cable (voltage $V_+-V_-$ in FIG. 2) is 5 volts.

Figure 7:
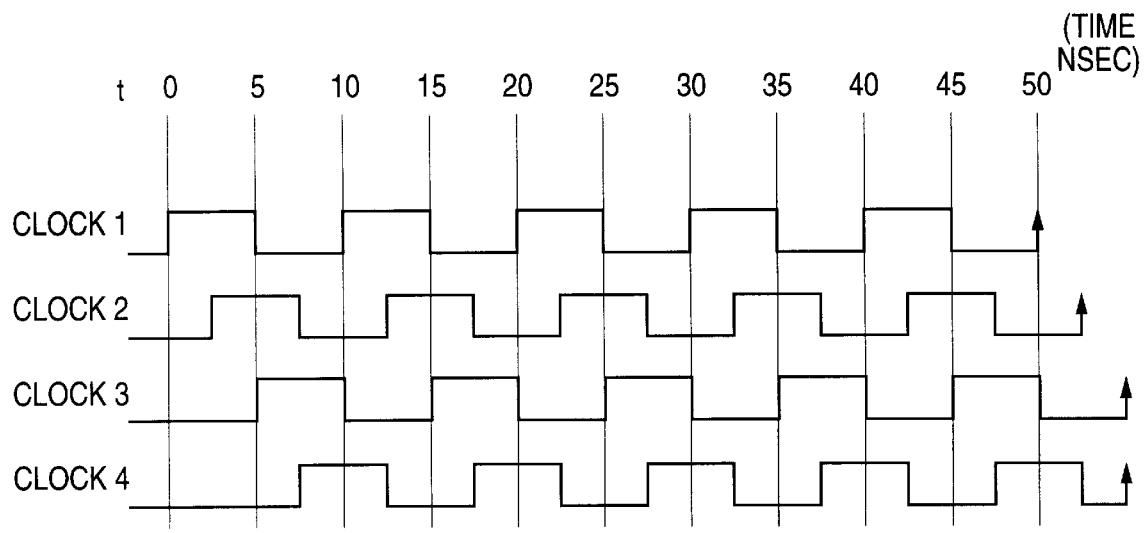
FIG. 7 is a diagram of waveforms of the four clock signals supplied to the FIG. 5 circuit.
Figure 13:
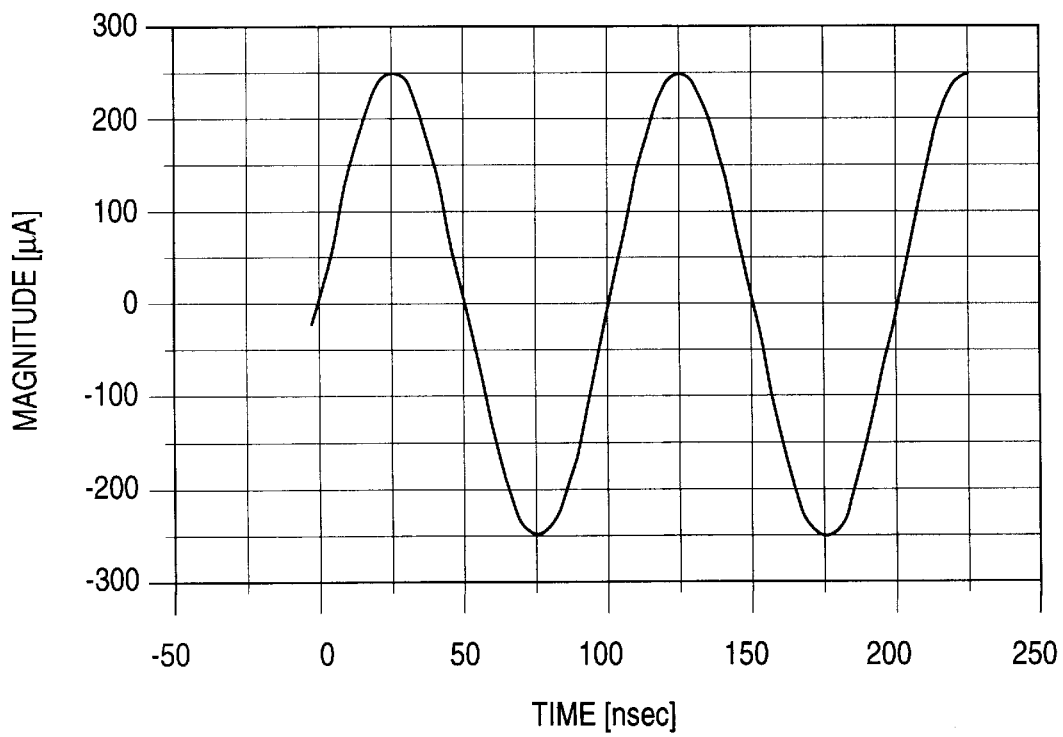
FIG. 13 is a waveform of the difference between signal "Ip" and signal "In" generated in response to a 10 MHz square wave signal DATA by the current summing circuit of a preferred implementation of the inventive waveshaping circuit (a preferred implementation of circuit 24 of a preferred implementation of circuit 15 of FIG. 2)

PLL circuit 20 operates in response to an oscillator signal to generate each of the clock signals needed by digital controller 22 ($CLOCK_1$ through $CLOCK_N$, where N is an integer, and the 20 MHz clock signal discussed below). Typically, each of clock signals $CLOCK_1-CLOCK_N$ has the same frequency (a frequency greater than the maximum frequency of data signal DATA), but each has a different phase than does each of the others. In preferred embodiments, data signal DATA has a maximum frequency of 10 MHz, there are four clock signals ($CLOCK_1$, $CLOCK_2$, $CLOCK_3$, and $CLOCK_4$), each clock signal has a frequency of 100 MHz, and each $CLOCK_{i+1}$ (where i is 0, 1, 2, or 3) is phase shifted by one-quarter period (2.5 nsec) relative to $CLOCK_i$, as indicated in FIG. 7.

Figure 1:
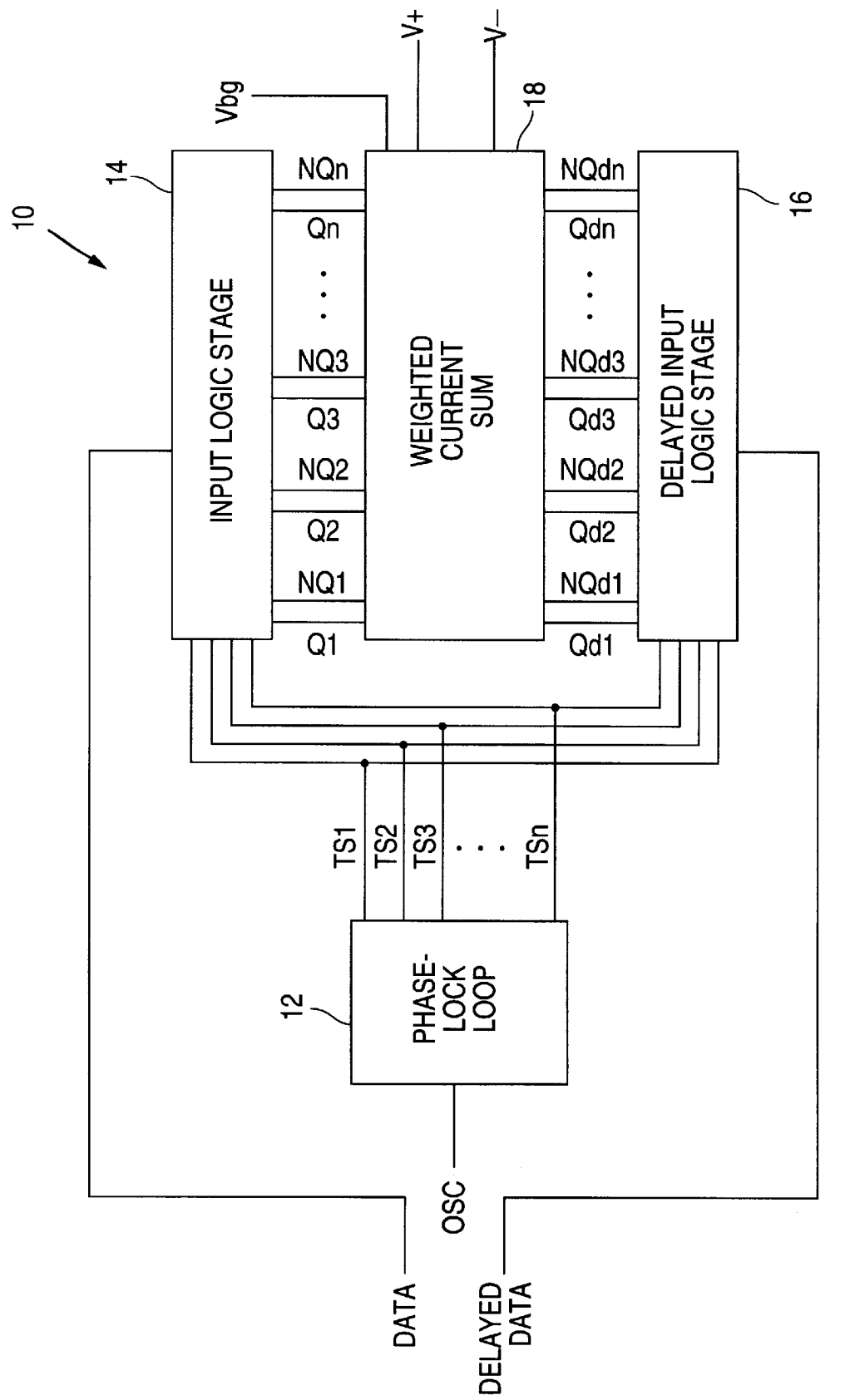
FIG. 1 is a block diagram of a conventional waveshaping circuit which generates an output signal which is intended to have an appropriate transmit waveform for transmission over a twisted cable pair, in response to a binary data signal (and a delayed version of the binary data signal).

The specification of above-cited U.S. Pat. No. 5,357,145 is incorporated herein by reference. U.S. Pat. No. 5,357,145 discloses (with reference to FIG. 4 thereof) an implementation of PLL circuit 12 of FIG. 1 (of the present specification) which can be used to implement PLL circuit 20 of FIG. 2 of the present specification (with such an implementation of PLL circuit 20 being driven by a 100 MHz oscillator signal in embodiments in which signal DATA has a maximum frequency of 10 MHz). An advantage of the present invention is that its control signal generation circuitry (e.g., that of FIG. 5) is designed so that the timing of generation of control signals for the current source circuitry (e.g., that of FIGS. 3 and 4) is controlled by edges of one type only (preferably the rising edges) of clock signals output from a phase-lock loop (not by both the rising and falling edges of such clock signals). For this reason, a conventional PLL circuit (such as the PLL circuit described in U.S. Pat. No. 5,357,145) which produces clock signals having jitter between rising and falling edges thereof (or changes over time in the timing of such rising edges relative to such falling edges) can be used to implement PLL circuit 20 of the inventive system, and yet such clock signal errors will not significantly affect the relative timing of the rising edges alone of the clock signals and thus such errors will not significantly affect the timing of generation of control signals for the current source circuitry. Simple, inexpensive, conventional PLL circuits exist (e.g., the PLL circuit described in U.S. Pat. No. 5,357,145) which produce clock signals which have jitter between rising and falling edges thereof, and yet have much less (and typically insignificant) jitter between the rising edges thereof, and which exhibit changes over time in the timing of such rising edges relative to such falling edges, and yet exhibit much smaller (and typically insignificant) changes over time in the timing of such rising edges.

Figure 3B:
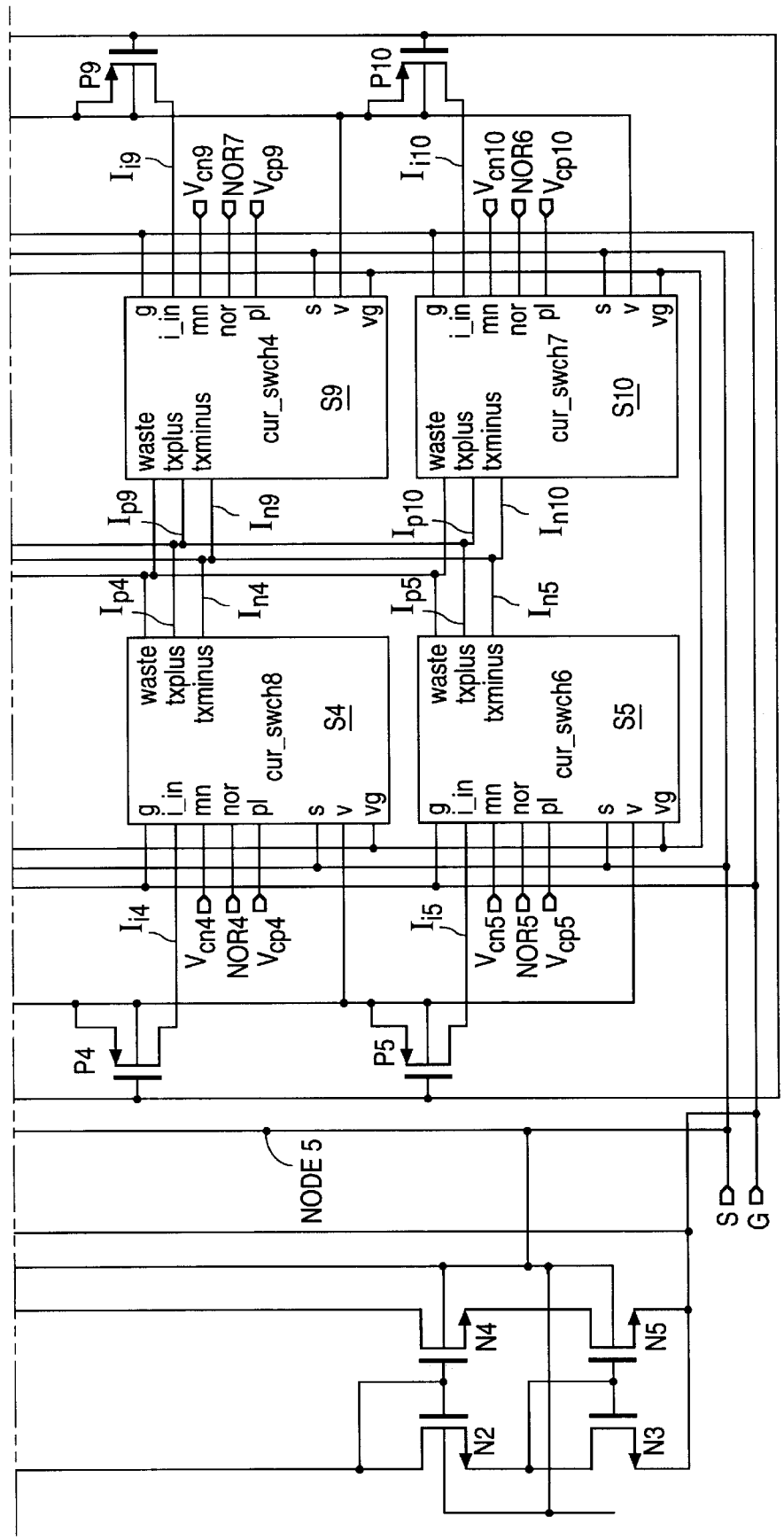
FIG. 3 is a diagram (partially schematic; partially in block form) of an embodiment of current summing circuit 24 of FIG. 2.
Figure 4:
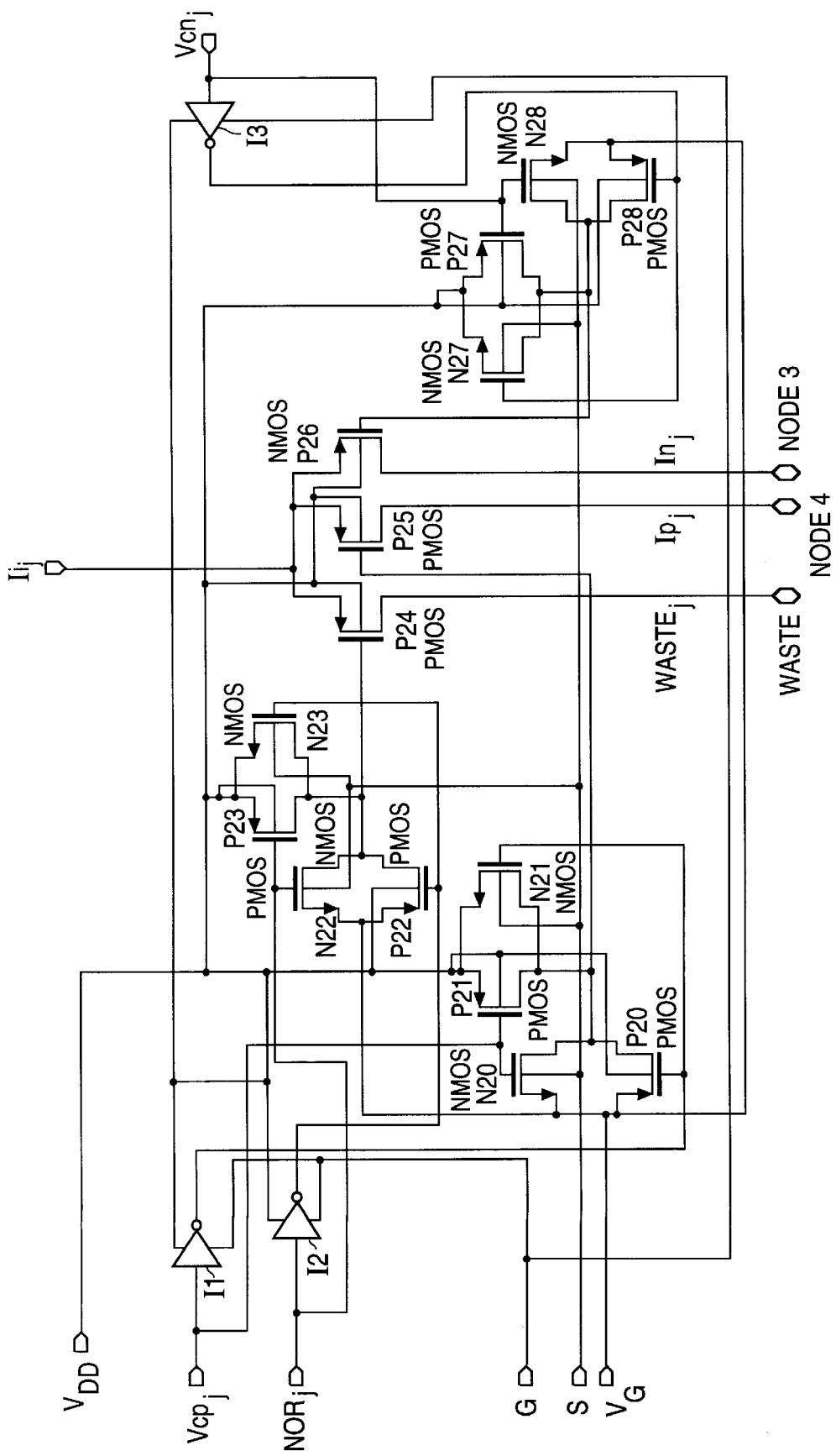
FIG. 4 is a schematic diagram of an embodiment of one of the ten current switch circuits (S1–S10) of FIG. 3.

Next, a preferred embodiment of current summing circuit 24 will be described with reference to FIGS. 3 and 4. FIG. 3 is a diagram (partially schematic and partially in block form) of this embodiment of current summing circuit 24, and FIG. 4 is a schematic diagram of an embodiment of one of the current switch circuits (S1–S10) of FIG. 3.

As shown in FIG. 3, current summing circuit 24 preferably includes ten current switch circuits, S1 through S10 (sometime referred to herein as modules S1–S10). Modules S1–S10 will be referred to as modules Sj, where "j" is an integer greater than 0 and less than 11. Each module Sj has a "waste" node (connected through NMOS transistor N6 to Node 5), a first output node (e.g., Node 4 in FIG. 3) at which current $Ip_j$ flows, and a second output node (e.g., Node 3 in FIG. 3) at which current $In_j$ flows. Except when generating an output current signal indicative of an "end of packet" code of the signal DATA, current summing circuit 24 operates in a two-step cycle (each step having duration 2/f, where f is the frequency of the portion of the signal DATA for which an output current signal is being generated): a first step in which module Sj sinks current $Ip_j$ at its first output node and sinks zero (or substantially zero) amps at its second output node; and a second step in which module Sj sinks current $In_j$ at its second output node and sinks zero (or substantially zero) amps at its first output node. Since all the first output nodes are connected together, all the component currents $Ip_j$ sum together to produce output current Ip (which is the total current sunk by circuit 24 from line driver 17 during the first step of the cycle). Similarly, since all the second output nodes are connected together, all the component currents $In_j$ sum together to produce output current In (which is the total current sunk by circuit 24 from line driver 17 during the second step of the cycle). Output current In is zero amps (or substantially equal to zero amps) during the first step of the cycle), and output current Ip is zero amps (or substantially equal to zero amps) during the second step of the cycle. The waveforms of output current Ip (sometimes referred to as the "first partial output current signal") and output current In (sometimes referred to as the "second partial output current signal") are discussed above.

Node 5 of FIG. 3 is held at potential "S" (a low potential, slightly higher than ground potential "G") and is coupled to circuit elements (not shown) capable of sinking current from the elements of the FIG. 3 circuit connected to Node 5. The bulk node of each NMOS transistor of FIG. 3 is tied to Node 5, and Node 5 is typically connected to ground (by circuitry external to circuit 15), to avoid noise that might otherwise result from connecting these bulk nodes directly to ground within circuit 15.

The FIG. 3 embodiment of circuit 24 includes a cascode circuit mirror comprising NMOS transistors N1, N2, N3, N4, N5, and N6, and PMOS transistors P1 through P17 connected as shown. The cascode circuit mirror is enabled by asserting control signal WS_EN with a logical high level to the gates of transistors N1 and P15. When the cascode circuit mirror has been enabled, bandgap reference current $I_{BG}$ is mirrored by transistors N2–N5 (connected as shown, with the sources of transistors N3 and N5 held at ground potential G as indicated). The high swing cascode PMOS current mirror comprising transistors P11, P12, P13, and P14 is connected as shown to the current mirror comprising transistors N2–N5 (with the drains of transistors P11 and P13 held at supply voltage $V_{DD}$ as indicated). The L/W (length to width) ratios of transistors P11–P14 are chosen so that the gates of transistors P11 and P13 (connected together at Node 1) are at the desired bias voltage $V_B$. The gates of transistors P1–P10 are all connected to Node 1, so that they are all biased at the desired bias voltage $V_B$.

The source of transistor P13 is connected to the drain of transistor P14 at Node 2. The characteristics of transistors P11–P14 and N6 are chosen so that Node 2 is at a desired bias voltage $V_G$. Node 2 is connected (and thus bias voltage $V_G$ is supplied) to transistors within each of circuits S1–S10 as shown in FIG. 4. These transistors (e.g., transistors P20, N20, P22, N22, P28, and N28 of FIG. 4) function as transmission switches which selectively pass through voltage $V_G$ to the gates of other transistors (e.g., P24, P25, and P26 of FIG. 4), which will sometimes be denoted as "output" transistors, whose state determines the current at output nodes of the modules S1–S10. Digital control bits supplied from controller 22 to the gates of the transmission switches determine whether voltage $V_G$ (or a supply voltage $V_{DD}$) is supplied from the transmission switches to the gates of the output transistors. Preferably, the value of $V_G$ is chosen to set the bias of the output transistors (of each of modules S1–S10) so as to minimize ringing on those of the output nodes which are current summing nodes (Node 3 and Node 4 shown in FIG. 3).

As shown in FIG. 3, each module Sj is connected to the source of a different one of PMOS transistors P1 through P10. The drain of each of transistors P1 through P10 is held at supply voltage $V_{DD}$. The gate of each of transistors P1–P10 is biased at voltage $V_B$ as a result of being connected to the above-described bandgap voltage reference circuit. The L/W (length to width) ratio of each of transistors P1–P10 is chosen so that a desired current $Ii_j$ (where j is an integer greater than 0 and less than 11) flows between transistor Pj and module Sj (as indicated in FIG. 3).

The modules Sj are preferably identical, and each preferably has the structure shown in FIG. 4. In the FIG. 4 embodiment, each module Sj receives input current $Ii_j$ from transistor Pj and includes high precision switching circuitry (PMOS transistors P20, P21, P22, P23, P24, P25, P26, P27, and P28, and NMOS transistors N20, N21, N22, N23, N27, and N28 connected as shown in FIG. 4). The high precision switching circuitry steers input current $Ii_j$ (i.e., asserts a current substantially equal to input current $Ii_j$) to one of the following nodes: a first output node (Node 4 of FIG. 4 and FIG. 3, which is typically connected to a line driver circuit such as circuit 17 of FIG. 2); a second output node (Node 3 of FIG. 4 and FIG. 3) which is also typically connected to a line driver circuit such as circuit 17 of FIG. 2; and a "waste" node (WASTE in both FIG. 3 and FIG. 4). The current steered to the first output node is component current $Ip_j$, and the module is controlled so that the amplitude of component current $Ip_j$ is equal (or substantially equal) to zero during the second step of the above-mentioned two-step current summing cycle. The current steered to the second output node is component current $In_j$, and the module is controlled so that the amplitude of component current Ini is equal (or substantially equal) to zero during the first step of the two-step current summing cycle.

Figure 8:
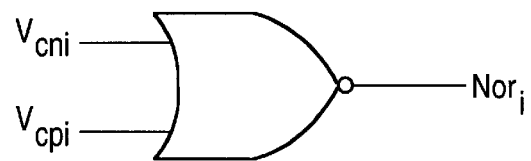
FIG. 8 is a diagram of one of ten NOR gates used (in a preferred embodiment of digital controller circuit 22 of FIG. 2) to process the twenty output signals generated by the FIG. 5 circuit (and the identical counterpart to the FIG. 5 circuit).

More specifically, each module Sj receives three control signals ($Vcp_j$, $Vcn_j$, and $NOR_j$) from digital controller 22. The description of FIGS. 3–6 and 8 assumes that each of these control signals represents a logical "1" when its value (voltage level) is high (above a threshold), and a logical "0" when its value is low (below the threshold). Controller 22 includes circuitry for generating the twenty control signals $Vcp_1$, $Vcn_1$, $VCp_2$, $Vcn_2$, ..., $Vcp_{10}$, and $Vcn_{10}$, and also includes ten NOR gates of the type shown in FIG. 8 (to be referred to as NOR gates $NOR_1$ through $NOR_{10}$). The inputs of each NOR gate $NOR_j$ receives control signals $Vcp_j$ and $Vcn_j$, and in response the output of each such NOR gate asserts control signal $NOR_j$. Since a logical "0" value of control signal $Vcp_j$ (or $Vcn_j$) indicates that zero component current $Ip_j$ (or $In_j$) should flow from the corresponding module Sj, control signal $NOR_j$ will have a logical value "1" only when neither current $Ip_j$ nor $In_j$ is to flow from the corresponding module Sj.

In the FIG. 4 embodiment, each module Sj includes inverter I1 connected as shown (for generating the complement of control signal $Vcp_j$), inverter I2 completed as shown (for generating the complement of control signal $NOR_j$), and inverter I3 connected as shown (for generating the complement of control signal $Vcn_j$).

Each module Sj includes switch circuitry (e.g., transistor P25 of FIG. 4) through which input current $Ii_j$ selectively flows (as component current $Ip_j$) to the first output node (Node 4) in response to control signal $Vcp_j$ from controller 22 having a logical value ("1"). In the FIG. 4 embodiment, PMOS transistors P20 and P21 and NMOS transistors N20 and N21 are connected as shown, with the gate of each receiving control signal $Vcp_j$ or its complement. When control signal $Vcp_j$ has a logical "1" value, transistors P20 and N20 are on and transistors P21 and N21 are off, and thus low potential $V_G$ is supplied to the gate of transistor P25 (thereby causing P25 to conduct the appropriate current $Ip_j$ to Node 4). When control signal $Vcp_j$ has a logical "0" value, transistors P20 and N20 are off and transistors P21 and N21 are on, and thus high potential $V_{DD}$ is supplied to the gate of transistor P25 (thereby causing P25 to conduct no significant current to Node 4).

Each module Sj also includes switch circuitry (e.g., transistor P26 of FIG. 4) through which input current $Ii_j$ selectively flows (as component current $In_j$) to the second output node (Node 3) in response to control signal $Vcn_j$ from controller 22 having a logical value ("1"). In the FIG. 4 embodiment, PMOS transistors P27 and P28 and NMOS transistors N27 and N28 are connected as shown, with the gate of each receiving control signal $Vcn_j$ or its complement. When control signal $Vcn_j$ has a logical "1" value, transistors P28 and N28 are on and transistors P27 and N27 are off, and thus low potential $V_G$ is supplied to the gate of transistor P26 (thereby causing P26 to conduct the appropriate current $In_j$ to Node 3). When control signal $Vcn_j$ has a logical "0" value, transistors P28 and N28 are off and transistors P27 and N27 are on, and thus high potential $V_{DD}$ is supplied to the gate of transistor P26 (thereby causing P26 to conduct no significant current to Node 4).

In preferred implementations, digital controller 22 operates in a manner (to be described below) such that both control signal $Vcp_j$ and $Vcn_j$ never have logical value "1" at the same time.

Preferably, each module Sj also includes switch circuitry (e.g., transistor P24 of FIG. 4) through which input current $Ii_j$ is sunk to "waste" node (WASTE) in response to a control signal from controller 22 (i.e., signal $NOR_j$) having a logical value indicating that no current should be steered to either of the current summing output nodes (i.e., in response to control signal $NOR_j$ having a logical value "1" which indicates that there should be no flow of current $Ip_j$ or $In_j$ to Node 3 or Node 4). In the FIG. 4 embodiment, when control signal $NOR_j$ has a logical "1" value, transistors P22 and N22 are off and transistors P23 and N23 are on, and thus low potential $V_G$ is supplied to the gate of transistor P24. When control signal $NOR_j$ has a logical "1" value, control signals $Vcp_j$ and $Vcn_j$ both have logical "0" values so that transistors N20 and N28 are off and transistors P21 and P27 are on, and thus high potential $V_{DD}$ is supplied to the gates of transistors P25 and P26. In response, P24 is on and both P25 and P26 are off, and thus input current $Ii_j$ is steered through P24 (as a waste current "$Waste_j$") to the WASTE node. As noted above, the waste current flowing to the WASTE node is sunk through transistor N6 (of FIG. 3). The sinking of current through to the WASTE node limits undesired current swings (which might otherwise occur due to undesired charge injection) in the output current signals ($Ip_j$ and $In_j$) asserted at the current summing output nodes, by ensuring that there is a path for input current $Ii_j$ under all conditions.

Next, a preferred embodiment of digital controller 22 will be described with reference to FIGS. 5, 6, 7, 8, 10, and 11. In this embodiment, digital controller 22 includes two identical sets of logic circuitry of the type shown in FIG. 5: one for generating control signals $Vcp_j$ (indicating non-zero values in the first step of a two-step process); the other for generating control signals $Vcn_j$ (indicating non-zero values in the second step of the two-step process). The two-step process is performed cyclically (with frequency F) in response to each periodic portion of input data signal DATA (where the data bits determined by such periodic portion of signal DATA have frequency F).

Figure 5:
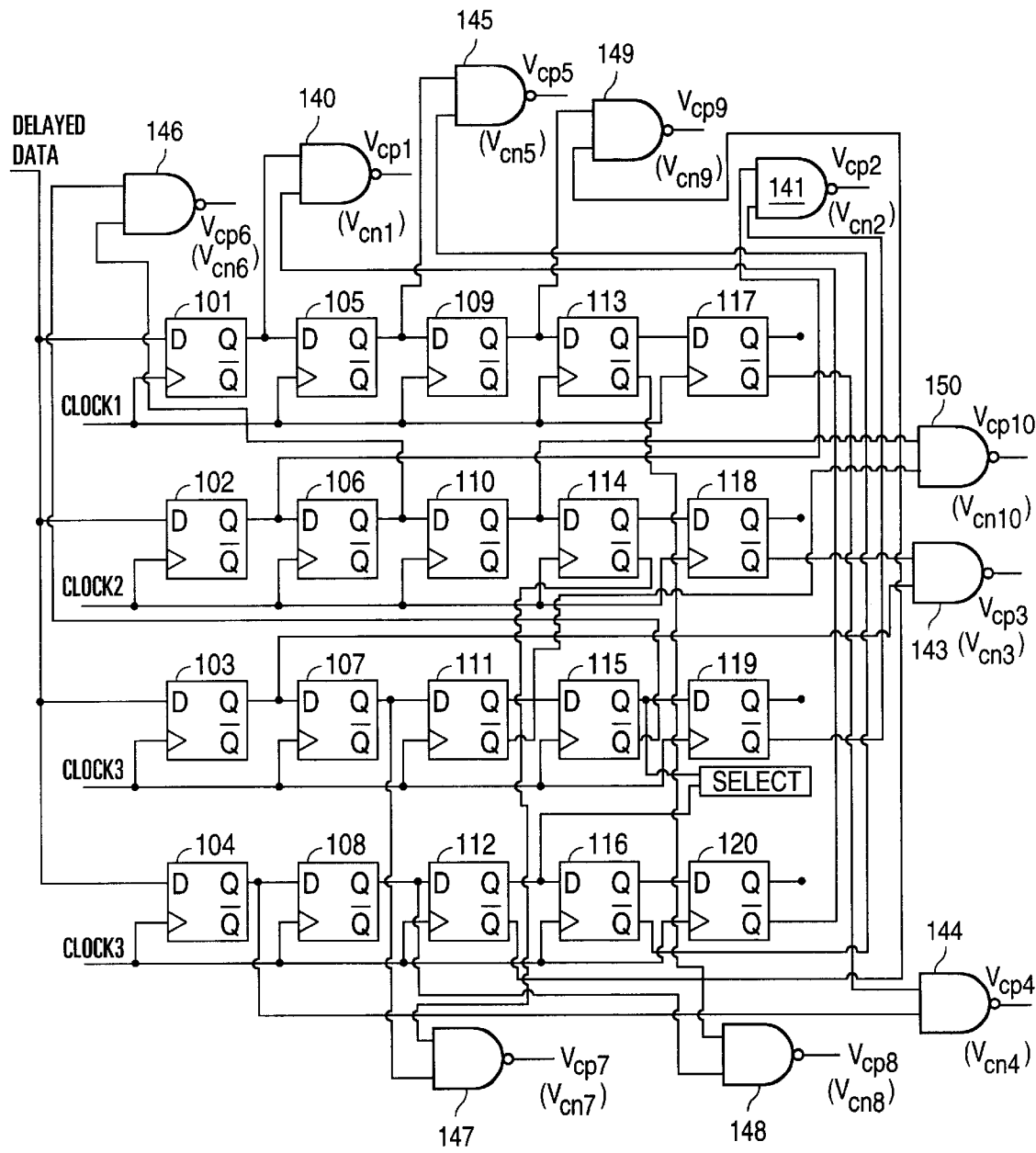
FIG. 5 is a block diagram of a preferred embodiment of one of two shift register circuits within digital controller circuit 22 of FIG. 2.

Because the current generated by circuit 24 in response to control signals $Vcn_j$ is typically subtracted from the current generated by circuit 24 in response to control signals $Vcp_j$, the FIG. 5 circuit (which generates the ten signals $Vcp_j$) is sometime referred to as the "positive" shift register circuit and the other circuit which is identical to FIG. 5 circuit (except in that it includes a slightly different implementation of selection circuit 130 than does the "positive" shift register circuit) but which generates the ten signals $Vcn_j$ is sometimes referred to as the "negative" shift register circuit.

The preferred embodiment of digital controller 22 also includes circuitry (not shown) which selectively disables one of the positive shift register circuit and the negative shift register circuit, in the sense that it causes the disabled circuit to assert all ten control signals ($Vcp_j$ or $Vcn_j$) with low voltage levels. In response to all of control signals $Vcp_1$, $Vcp_2$, $Vcp_3$, $Vcp_4$, $Vcp_5$, $Vcp_6$, $Vcp_7$, $Vcp_8$, $Vcp_9$, and $Vcp_{10}$ (or $Vcn_1$, $Vcn_2$, $Vcn_3$, $Vcn_4$, $Vcn_5$, $Vcn_6$, $Vcn_7$, $Vcn_8$, $Vcn_9$, and $Vcn_{10}$) having low voltage levels, circuit 24 asserts current signal Ip (or In) with an amplitude equal (or substantially equal) to zero amps.

As will be explained in greater detail below, the signal DATA is typically indicative of a sequence of packets of binary data, each packet indicative of a sequence of Manchester encoded binary bits followed by an "end of packet" binary bit pattern. In the case of a Manchester encoded voltage or current signal, the signal has a transition in the middle of each bit period, and a first type of transition (e.g., a rising edge) determines a logical "0" and a second type of transition (e.g., a falling edge) determines a logical "1." The Manchester encoded signal received in accordance with typical embodiments of the invention thus determines a sequence of square wave portions: some having frequency F; others having frequency 2F. In preferred embodiments of the invention, F=5 MHz and 2F=10 MHz, and the "end of packet" pattern is indicated by a number of bit periods (one or more bit periods) having no transitions. The preferred embodiment of digital controller 22 includes logic circuitry (shown in FIGS. 10 and 11) which recognizes each of the three bit patterns of the signal DATA (5 MHz, 10 MHz, and "end of packet") and asserts a distinct set of values of internal control bits (bits PRESEL, PRESELB, ENDSEL, and ENDSELB) to the shift register circuit of FIG. 5 (or bits PRESEL and PRESELB to the other shift register circuit having the structure shown in FIG. 5) in response to each cycle of each recognized bit pattern. The values of the control bits $Vcp_j$ and $Vcn_j$ asserted from digital controller 22 to current summing circuit 24 depend on the values of the internal control bits (in a manner to be explained below).

The circuitry of FIGS. 10 and 11 (to be described below) processes the data signal DATA to recognize each of the three bit patterns thereof. Because this decoding process consumes time (i.e., time $T_d$), the preferred embodiment of digital controller 22 includes circuitry (not shown) which delays the signal DATA by an appropriate time ($T_d'$) thereby generating a delayed data signal DELAYED DATA. The signal DELAYED DATA is asserted to the "D" terminal of each of flip-flops 101, 102, 103, and 104 in FIG. 5. The delay time $T_d'$ is chosen so that, when the signal DATA undergoes a transition from one bit pattern to another (e.g., from a 10 MHz portion to a 5 MHz portion), the circuitry of FIGS. 10 and 11 will have recognized this transition and asserted corresponding control signals to selection circuit 130 in time to process the output of flip-flop 115 being asserted to circuit 130 in response to the delayed signal DELAY DATA.

As shown in FIG. 5, each of the positive shift register circuit and the negative shift register circuit comprises four shift registers, NAND gates 140–150 (connected as shown), and logic circuitry (selection circuit 130 connected as shown) which has a different configuration for each of at least two different bit patterns of delayed data signal DELAYED DATA, and NAND gates 140–150. Each shift register comprises five stages, each stage is implemented by a flip-flop circuit, and each shift register driven by a different clock signal. More specifically: one shift register comprises flip-flops 101, 105, 109, 113, and 117 (connected as shown) and is driven by clock signal $CLOCK_1$; the second shift register comprises flip-flops 102, 106, 110, 114, and 118 (connected as shown) and is driven by clock signal $CLOCK_2$; the third shift register comprises flip-flops 103, 107, 111, 115, and 119 (connected as shown) and is driven by clock signal $CLOCK_3$; and the fourth shift register comprises flip-flops 104, 108, 112, 116, and 120 (connected as shown) and is driven by clock signal $CLOCK_4$.

Each clock signal has the same frequency (a frequency greater than the maximum frequency of data signal DATA), but each has a different phase than does each of the others. In implementations in which data signal DATA has a maximum frequency of 10 MHz, each of the clock signals ($CLOCK_1$, $CLOCK_2$, $CLOCK_3$, and $CLOCK_4$) preferably has a frequency of 100 MHz, and each $CLOCK_{i+1}$ (where i is 0, 1, 2, or 3) is phase shifted by one-quarter period (2.5 nsec) relative to $CLOCK_i$, as indicated by the waveforms shown in FIG. 7. Each of flip-flops 101–120 asserts the voltage at its "D" input to its "Q" output in response to the rising edge of the clock signal supplied thereto.

FIG. 6 is a preferred embodiment of selection circuit 130 (of FIG. 5) in the "positive" shift register circuit of the preferred implementation of digital controller 22. In this embodiment, selection circuit 130 comprises a shift register consisting of flip-flops 131, 132, 133, 134, and 135 (connected in series as shown and driven by a 20 MHz clock signal which is the same 20 MHz signal which drives the circuits of FIGS. 10 and 11 to be described below), AND gates 136, 137, and 138 (connected as shown), and OR gate 139 whose three inputs receive the outputs of AND gates 136, 137, and 138. The selection circuit 130 in the positive shift register circuit receives control signals PRESEL, ENDSEL, PRESELB, and ENDSELB generated by the FIG. 10 circuit. More specifically, the three inputs of AND gate 136 receive control signals PRESELB and ENDSELB and the output of flip-flop 131, the three inputs of AND gate 137 receive control signals PRESEL and ENDSEL and the output of flip-flop 132, and the three inputs of AND gate 138 receive control signals PRESELB and ENDSEL and the output of flip-flop 135. Terminal D of flip-flop 131 receives the data signal output from output terminal "Q" of flip-flop 115 (shown in FIG. 5) of the "positive" shift register circuit, and the output of OR gate 139 is asserted to terminal "D" of flip-flop 116 (shown in FIG. 5) of the "positive" shift register circuit.

FIG. 6A is a preferred embodiment of selection circuit 130 (of FIG. 5) in the "negative" shift register circuit of the preferred implementation of digital controller 22. In the FIG. 6A embodiment, selection circuit 130 comprises a shift register consisting of flip-flops 131, 132, 133, 134, and 135 (connected in series as shown and driven by a 20 MHz clock signal which is the same 20 MHz signal which drives the circuits of FIGS. 10 and 11 to be described below), AND gates 136', 137', and 138' (connected as shown), and OR gate 139 whose three inputs receive the outputs of AND gates 136', 137', and 138'. The selection circuit 130 in the negative shift register circuit receives control signals PRESEL and PRESELB generated by the FIG. 11 circuit. More specifically, the two inputs of AND gate 136' receive control signal PRESELB and the output of flip-flop 131, the two inputs of AND gate 137' receive control signal PRESEL and the output of flip-flop 132, and the two inputs of AND gate 138' receive control signal PRESELB and the output of flip-flop 135. Terminal D of flip-flop 131 of FIG. 6A receives the data signal output from output terminal "Q" of flip-flop 115 of the "negative" shift register circuit, and the output of OR gate 139 of FIG. 6A is asserted to terminal "D" of flip-flop 116 of the "negative" shift register circuit.

The phase of the 20 MHz clock is set so that in both the FIG. 6 and FIG. 6A implementations of circuit 130, the 20 MHz clock rises after assertion of each rising edge of signal $CLOCK_3$ to flip-flip 115 but before assertion of the next rising edge of signal $CLOCK_4$ to flip-flip 116. Selection circuit 130 controls a delay that distinguishes between different bit patterns of the signal DATA. For a bit pattern determined to be a 10 MHz square wave, the control signals received by circuit 130 cause OR gate 139 to assert the output of flip-flop 131 (131') to flip-flop 116. For a bit pattern determined to be a 5 MHz pattern or an "end of packet" pattern, the control signals received by circuit 130 cause OR gate 139 to assert the output of flip-flop 132 (132') or 138 (138') to flip-flop 116.

Figure 9B:
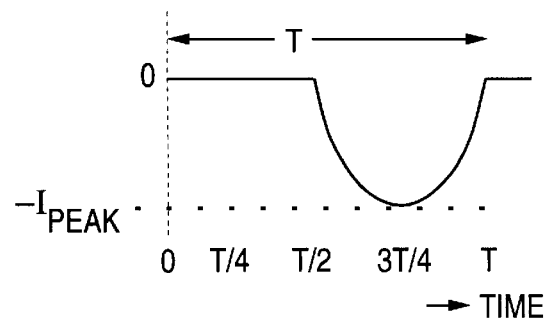
Figure 9C:
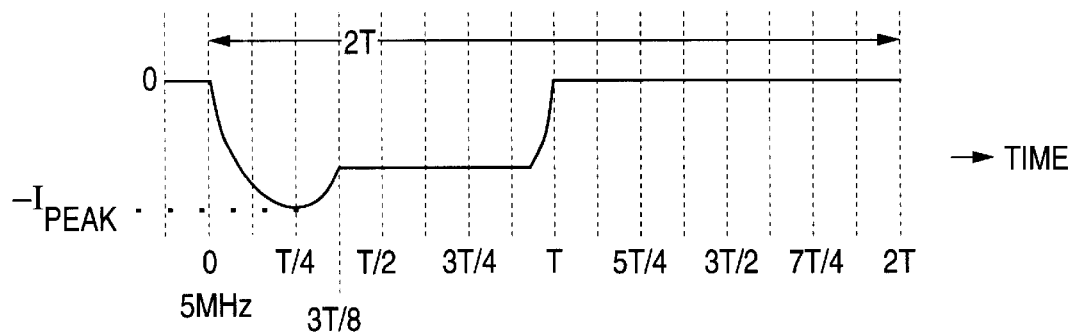
Figure 9D:
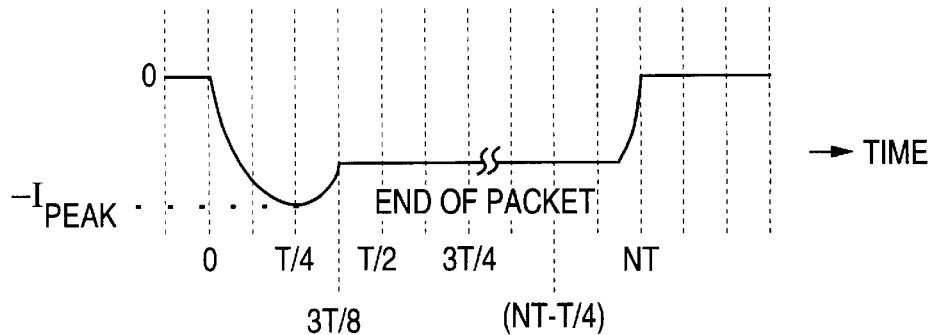
Figure 10:
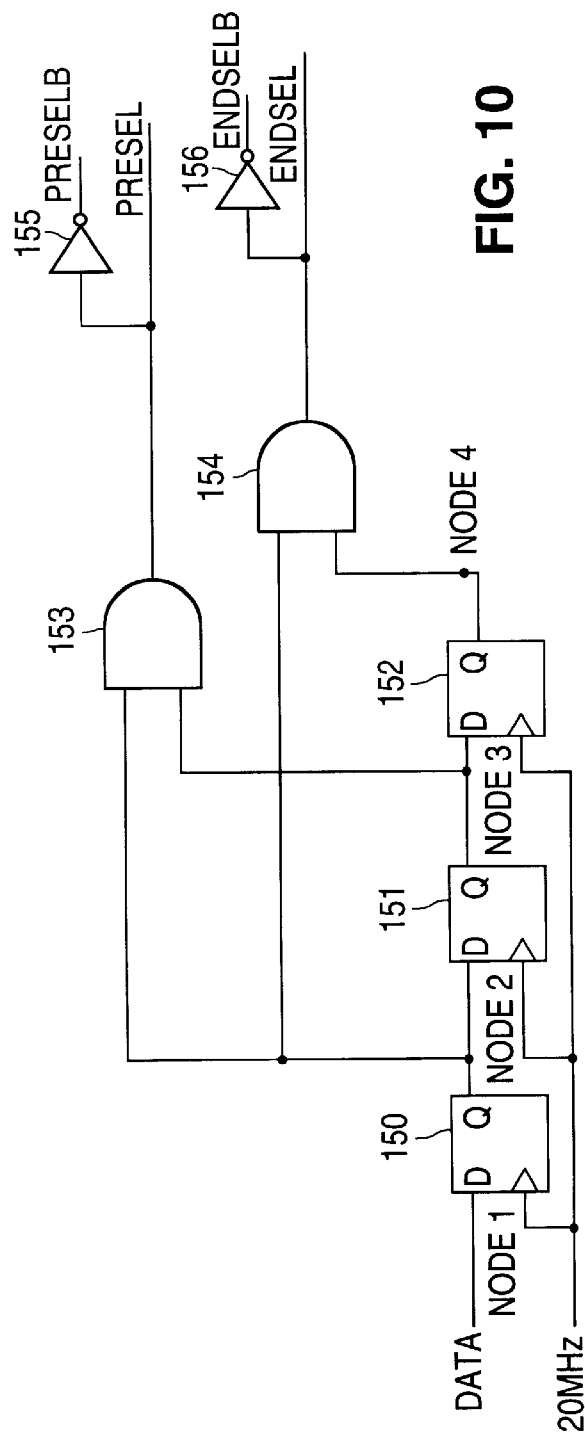
FIG. 10 is a block diagram of another portion of the preferred embodiment of digital controller circuit 22 of FIG. 2 (which generates control signals used for controlling operation of the "positive" shift register circuit having structure shown in FIG. 5).

Next, we describe (with reference to FIGS. 10 and 11) the circuitry within the preferred embodiment of digital controller 22 which generates a different set of internal control bits for each of three different bit patterns of the input data (10 MHz data, "predistortion 5 MHz" data, and "end of packet" data). FIG. 10 is the control block portion of the preferred embodiment of digital controller 22 which generates control signals PRESEL, ENDSEL, PRESELB, and ENDSELB for controlling operation of the "positive" shift register circuit having structure shown in FIG. 5. The FIG. 10 circuit comprises flip-flops 150, 151, and 152 (connected in series as shown and driven by the same 20 MHz clock signal described above which drives the circuits of FIGS. 6 and 6A), AND gate 153 (having one input connected to the "Q" output of flip-flop 150 and another input connected to the "Q" output of flip-flop 151), inverter 155 connected to the output of AND gate 153, AND gate 154 (having one input connected to the "Q" output of flip-flop 150 and another input connected to the "Q" output of flip-flop 152), and inverter 156 connected to the output of AND gate 154. Each of flip-flops 150, 151, and 152 asserts the voltage at its "D" input to its "Q" output in response to each rising edge of the 20 MHz clock, and resets the voltage at its "Q" output to a low level (indicative of a logical "zero") in response to each falling edge of the voltage at its "D" input. Thus, in response to each portion of signal DATA received at the "D" input of flip-flop 150 of FIG. 10, circuits 153, 154, 155, and 156 assert control signals PRESEL, ENDSEL, PRESELB, and ENDSELB to control selection circuit 130 (of the positive shift register circuit) with appropriate logical values at the appropriate times to cause generation of control bits $Vcp_j$ that determine one of three different waveforms (of the portion of signal Ip corresponding to the received portion of signal DATA). More specifically:

in response to a 10 MHz portion of signal DATA received at the "D" input of flip-flop 150 of FIG. 10, circuits 153, 154, 155, and 156 assert (to circuit 130) control signals PRESEL, ENDSEL, PRESELB, and ENDSELB, respectively, with logical levels PRESEL =0, ENDSEL=0, PRESELB=1, and ENDSELB=1 at the appropriate times to cause generation of a portion of signal "Ip" having the waveform shown in FIG. 9A;

in response to a 5 MHz portion of signal DATA received at the "D" input of flip-flop 150 of FIG. 10, circuits 153, 154, 155, and 156 assert (to circuit 130) control signals PRESEL, ENDSEL, PRESELB, and ENDSELB, respectively, with logical levels PRESEL =1, ENDSEL=0, PRESELB=0, and ENDSELB=1 at the appropriate times to cause generation of a portion of signal "Ip" having the waveform shown in FIG. 9C; and in response to an "end of packet" portion of signal DATA received at the "D" input of flip-flop 150 of FIG. 10, circuits 153, 154, 155, and 156 assert (to circuit 130) control signals PRESEL, ENDSEL, PRESELB, and ENDSELB, respectively, with logical levels PRESEL=0, ENDSEL=1, PRESELB=1, and ENDSELB=0 at the appropriate times to cause generation of a portion of signal "Ip" having the waveform shown in FIG. 9D.

Figure 11:
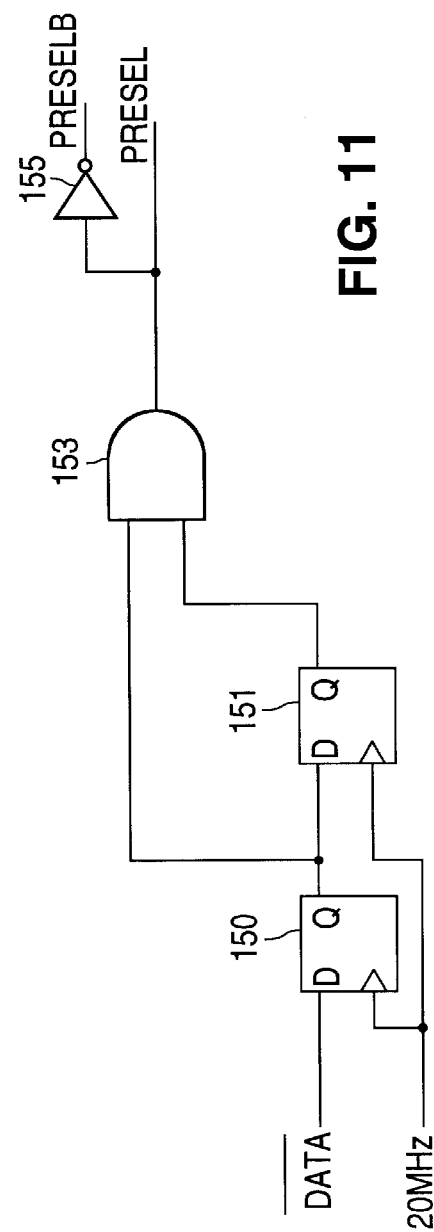
FIG. 11 is a block diagram of another portion of the preferred embodiment of digital controller circuit 22 of FIG. 2 (which generates control signals used for controlling operation of the "negative" shift register circuit having structure shown in FIG. 5).

FIG. 11 is the control block portion of the preferred embodiment of digital controller 22 which generates control signals PRESEL and PRESELB for controlling operation of the "negative" shift register circuit (which has the structure shown in FIG. 5). The FIG. 11 circuit comprises flip-flops 150 and 151 (connected as shown and driven by the same 20 MHz clock signal described above which drives the circuits of FIGS. 6, 6A, and 10), AND gate 153 (having one input connected to the "Q" output of flip-flop 150 and another input connected to the "Q" output of flip-flop 151), and inverter 155 connected to the output of AND gate 153. Each of flip-flops 150 and 151 asserts the voltage at its "D" input to its "Q" output in response to each rising edge of the 20 MHz clock, and resets the voltage at its "Q" output to a low level (indicative of a logical "zero") in response to each falling edge of the voltage at its "D" input. The FIG. 11 circuit receives the inverse of signal DATA at the "D" input of flip-flop 150 (rather than the signal DATA). Thus, in response to each portion of the inverse of signal DATA received at the "D" input of flip-flop 150 of FIG. 11, circuits 153 and 155 assert control signals PRESEL and PRESELB to control selection circuit 130 (of the negative shift register circuit) with appropriate logical values at the appropriate times to cause generation of control bits $Vcn_j$ that determine one of two different waveforms (of the portion of signal In corresponding to the received portion of signal DATA). More specifically:

in response to a 10 MHz portion of the inverse of signal DATA received at the "D" input of flip-flop 150 of FIG. 11, circuits 153 and 155 assert (to circuit 130) control signals PRESEL and PRESELB, respectively, with logical levels PRESEL=0 and PRESELB=1 at the appropriate times to cause generation of a portion of signal "In" having the waveform shown in FIG. 9B; and in response to a 5 MHz portion (or an "end of packet" portion) of the inverse of signal DATA received at the "D" input of flip-flop 150 of FIG. 11, circuits 153 and 155 assert (to circuit 130) control signals PRESEL and PRESELB, respectively, with logical levels PRESEL=1, and PRESELB=0 at the appropriate times to cause generation of a corresponding portion of signal "In" having the appropriate waveform.

It should be recalled that for each portion of signal DATA received by the FIG. 10 circuit (and each portion of the inverse of DATA received by the FIG. 11 circuit), a corresponding portion of delayed signal DELAYED DATA is received by the positive and negative shift register circuits after an appropriate delay time (the above-discussed delay period $T_d$').

We next describe the waveforms of current signals "In" and "Ip" output that are output from the preferred embodiment of circuit 24, with reference to FIGS. 9A, 9B, 9C, and 9D.

In response to a portion of signal DATA which determines one cycle (having duration T) of a square wave data signal of frequency F (e.g., one Manchester-encoded "zero" bit that is followed by another Manchester-encoded "zero" bit), the waveform of partial output current signal "Ip" approximates the waveform shown in FIG. 9A (commencing at time "0" and ending at time "T"). In the preferred embodiment, such cycle of the square wave data signal has duration T=100 nsec (and such portion of signal DATA is said to be a "10 MHz" portion). The first half (of duration T/2, which is preferably 50 nsec) of the FIG. 9A waveform is that of the first half of an inverted sine wave. The second half (also of duration T/2) of the FIG. 9A waveform is a zero (or substantially zero) amplitude waveform. In response to the same cycle of the square wave data signal, the waveform of partial output current signal "In" approximates the waveform shown in FIG. 9B. The first half (of duration T/2, which is preferably 50 nsec) of the FIG. 9B waveform is a zero (or substantially zero) amplitude waveform. The second half (also of duration T/2) of the FIG. 9B waveform approximates that of the second half of an inverted sine wave.

In response to a portion of signal DATA which determines one cycle (having duration 2T) of a signal of frequency F/2 (e.g., two Manchester-encoded bits: a Manchester-encoded "zero" bit followed by a Manchester-encoded "one" bit), the waveform of partial output current signal "Ip" approximates the waveform shown in FIG. 9C (commencing at time "0" and ending at time "2T"). In the preferred embodiment, such cycle has duration 2T=200 nsec (and such portion of signal DATA is said to be a "5 MHz" or "predistortion 5 MHz" portion). The first portion (of duration 3T/8, which is preferably 37.5 nsec) of the FIG. 9C waveform is identical to that of the first portion (of the same duration) of the FIG. 9A signal. The remaining portion of the FIG. 9C waveform is as shown. The last half (of duration T) of the FIG. 9C waveform has zero (or substantially zero) amplitude. In response to the same cycle of the signal of frequency F/2, the waveform of partial output current signal "In" is as follows: its first half (of duration T) is a zero (or substantially zero) amplitude waveform; its second half approximates that of the first half (from time 0 to time T) of the FIG. 9C waveform.

In response to a portion of Manchester-encoded signal DATA which determines an "end of packet" code, the preferred embodiment generates partial output current signal "Ip" with a waveform approximating that shown in FIG. 9D (commencing at time "0" and ending at time "NT", where N is an integer in the range 0<N<5). This embodiment assumes that an "end of packet" code is one bit period (of duration T) which includes a transition followed by one, two, or three bit periods that include no transitions. In a typical implementation of the preferred embodiment, the bit period (T) is 100 nsec. The first portion (of duration 3T/8) of the FIG. 9D waveform is identical to that of the first portion (of the same duration) of the FIG. 9A signal. The remaining portion of the FIG. 9D waveform is as shown. At the end of the FIG. 9D waveform (during a short time period ending at time NT), the current amplitude undergoes a gradual return to zero (or substantially zero) amplitude. During generation of the partial output current signal "Ip" (having waveform approximating that shown in FIG. 9D), control bits $Vcn_j$ are disabled so that partial output current signal "In" has zero (or substantially zero) amplitude. It is desirable that current summing circuit 24 produces partial output current signal Ip with a waveform that undergoes a gradual return to zero (e.g., that shown in FIG. 9D) to avoid ringing and undershoot errors that would otherwise occur as a result of a sharp transition to zero amplitude.

Because each non-zero waveform of partial output currents "In" and "Ip" has the same shape for its initial portion (e.g., the period from t=0 to t=3T/8 in each of FIGS. 9A, 9C, and 9D, which is typically the first 37.5 nanoseconds of each), and because the shape of the remaining portion of each waveform is determined by a selected one of multiple sets of control signals ($Vcp_j$ and $Vcn_j$) generated by digital controller 22, current summing circuit 24 can be implemented with a small number of component current source modules (e.g., twenty modules, each for generating one of component currents $Ip_j$ and $In_j$). In the preferred embodiment, the total number of modules is further reduced (e.g., to ten modules S1–S10, as in FIG. 3) by including in each component current source module switching circuitry which can be controlled to steer a component current from a source to one of multiple output nodes (e.g., a first output node during the first step of a cycle and a second output node during a second step of the cycle as described).

As noted, the waveform of each partial output current signal (Ip and In) can only approximate the smoothly varying waveforms as shown in FIGS. 9A–9D. This is because each partial output current signal is composed of a sequence of sums of a finite number of component currents (each component current having a fixed amplitude) and thus has a stepped profile. The values of the component currents (and thus the differences between pairs of component current values) and the number of component current source modules should be chosen to achieve an adequate approximation to the desired smoothly varying output waveforms with circuitry of minimum cost and complexity. The cost and complexity of the circuitry is determined in part by the frequency of each clock used to drive the logic circuitry within the digital controller. With reference to FIG. 5 (and variations thereon comprising different numbers of shift registers), the resolution of the output current signals (Ip and In) is controlled by the switching frequency $F_s$, which is defined as follows: $F_s=(F_c)$ (M), where $F_c$ is the frequency of each clock ($CLOCK_1$, $CLOCK_2$, $CLOCK_3$, and $CLOCK_4$) and M is the number of shift registers (there are four shift registers in the FIG. 5 embodiment, each shift register comprising a row of five serially connected flip-flops).

To describe one preferred implementation (assuming that input signal DATA has maximum frequency 10 MHz, and that it is desired that signal In or Ip approximate one half cycle of a sine wave of period 100 nsec), we define the following quantities:

Step Size=$1/F_s$, and

Number of Steps=$N_s$=(50 nsec)/Step Size.

Figure 12:
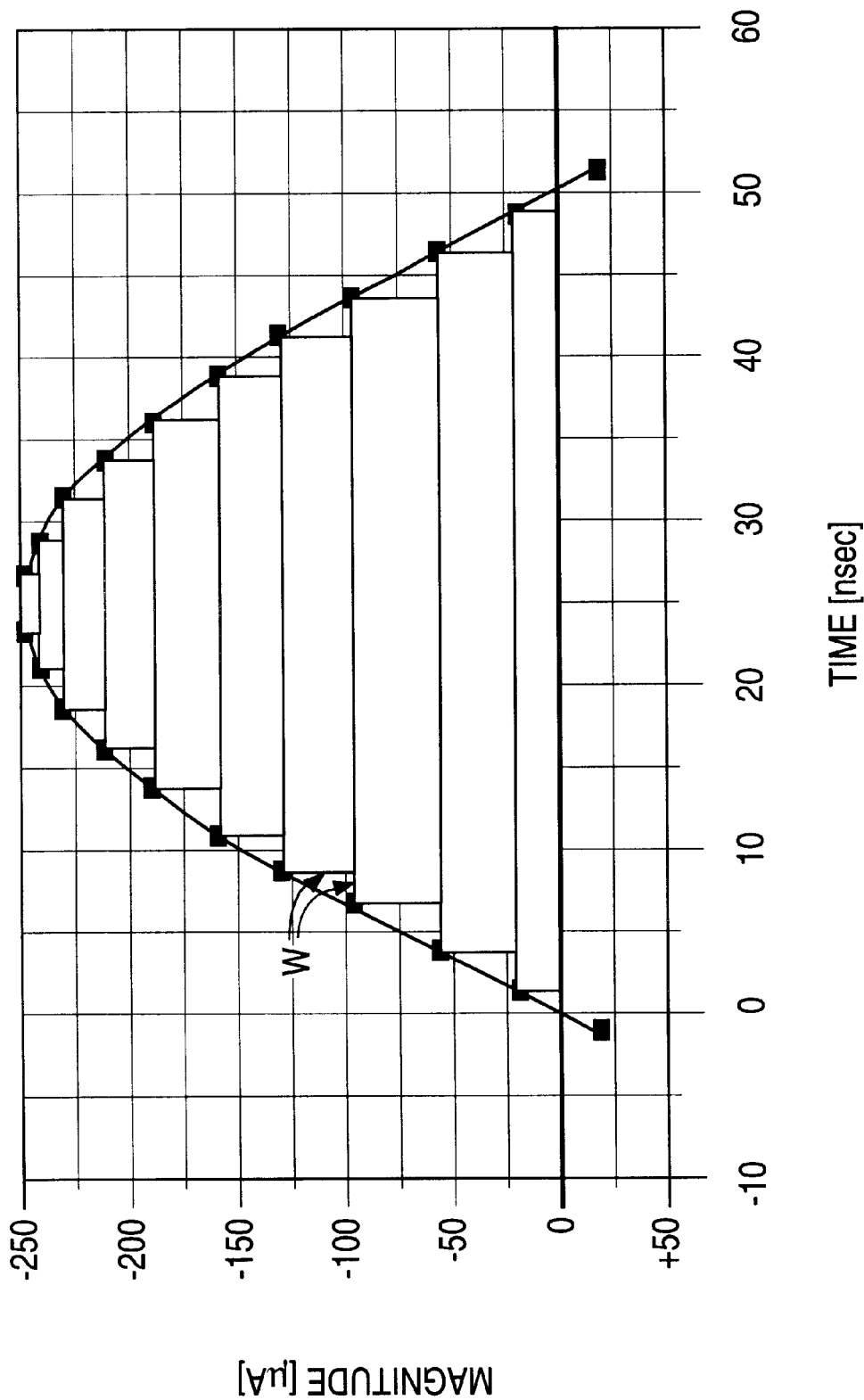
FIG. 12 is a waveform of a portion of signal "Ip" generated by the current summing circuit of a preferred implementation of the inventive waveshaping circuit (a preferred implementation of circuit 24 of a preferred implementation of circuit 15 of FIG. 2).

The inventor has recognized that in a class of preferred embodiments, the required number of component current source modules is $N_s/2$, and that in a preferred implementation of one of such embodiments:

$F_s=(F_c)$ (M)=(100 MHz) (4); Step Size=2.5 nsec; the required number of component current source modules is $N_s/2=10$; the peak current (of each of signals In and Ip) is –250 microAmps; and the ten component currents ($Ip_j=In_j$) have the values –39.1 microAmps, –38.1 microAmps, –36.2 microAmps, –33.4 microAmps, –29.8 microAmps, –25.5 microAmps, –20.5 microAmps, –15.0 microAmps, –9.16 microAmps, and –3.08 microAmps. In this implementation (with ten component current source modules S1–S10 as described with reference to FIGS. 3 and 4 implemented to assert component currents having the indicated values), circuit 15 of FIG. 2 can be controlled (using the described preferred embodiment of digital controller 22) to generate signal "Ip" with the stepped waveform "W" shown in FIG. 12 in response to a half cycle of a 10 MHz portion of signal DATA. Waveform "W" of FIG. 12 consists of twenty steps (each step determined by a different set of ten control bits $Vcp_j$), and adequately approximates half a cycle of an inverse sine wave.

It should be understood that various alternatives to the structures described herein may be employed in practicing the present invention. It is intended that the following claims define the invention and that structures within the scope of these claims and their equivalents be covered thereby.

What is claimed is:

1. A waveshaping circuit for generating an output current signal having a predetermined waveform, in response to a data signal comprising bit patterns, the waveshaping circuit comprising:

a controller, coupled to receive the data signal and configured to generate sets of binary control signals in response to the data signal, where each of the sets of binary control signals is generated in response to a different one of the bit patterns; and a current summing circuit, coupled to the controller to receive the sets of binary control signals, and configured to assert said output current signal having said predetermined waveform by sinking a sequence of currents determined by one of the sets of binary control signals, wherein each of the binary control signals in said one of the sets of binary control signals has a sequence of values over time, and each of the currents in the sequence is determined by the values of the binary control signals of said one of the sets of binary control signals in a different interval of time.

2. The circuit of claim 1, wherein the current summing circuit includes:

a first module having a first output and including circuitry configured to sink a first component current from the first output in response to a first subset of the binary control signals of said one of the sets of binary control signals; and a second module having a second output and including additional circuitry configured to sink a second component current from the second output in response to a second subset of the binary control signals of said one of the sets of binary control signals, wherein the second output is connected to the first output, whereby said output current signal includes a combination of the first component current and the second component current determined by said one of the sets of binary control signals.

3. The circuit of claim 2, wherein the first module includes:

a switch circuit coupled to receive the first subset of the binary control signals of said one of the sets of binary control signals and including steering circuitry configured to steer a current at least substantially equal to the first component current from a source to a selected one of multiple output nodes in response to said first subset having a first set of values, and wherein the second module includes:

another switch circuit coupled to receive the second subset of the binary control signals of said one of the sets of binary control signals and including additional steering circuitry configured to steer a current at least substantially equal to the second component current from a second source to any selected one of the multiple output nodes in response to said second subset.

4. The circuit of claim 3, wherein the switch circuit includes:

a waste node; and a switch which steers the current at least substantially equal to the first component current from the source to the waste node in response to the first subset having a second set of values.

5. The circuit of claim 2, wherein the controller asserts a different one of the sets of binary control signals in response to each of the bit patterns, wherein the current summing circuit is configured to respond to each said different one of the sets of binary control signals by operating in a two-stage cycle including a first stage in which the current summing circuit generates a first partial output current signal having a waveform which determines a first portion of the waveform of the output current signal, and a second stage in which the current summing circuit generates a second partial output current signal having a second waveform which determines a second portion of the waveform of the output current signal.

6. The circuit of claim 5, wherein the second portion of the waveform of the output signal is an approximation of a second half cycle of a sine wave, and an inverse of the first portion of the waveform of the output current signal is an approximation of a first half cycle of the sine wave.

7. The circuit of claim 5, wherein the first partial output current signal has a 50% duty cycle and the second partial output current signal has a 50% duty cycle out of phase with that of the first partial output current signal.

8. The circuit of claim 5, wherein the first partial output current signal has amplitude at least substantially equal to zero amps during the first stage and the second partial output current signal has amplitude at least substantially equal to zero amps during the second stage.

9. The circuit of claim 1, wherein the controller generates a first set of the control signals in response to a square wave portion of frequency F of the data signal, the controller generates a second set of the control signals in response to a portion of frequency F/2 of the data signal, and the controller generates a third set of the control signals in response to an end of packet code portion of the data signal, and wherein the current summing circuit asserts said output current signal in response to each of the first set, the second set, and the third set.

10. The circuit of claim 9, wherein the output current signal generated in response to the first set has a waveform that includes a portion which is an approximation of a second half cycle of a sine wave of said frequency F, and another portion which is an approximation of a first half cycle of an inverted version of said sine wave.

11. The circuit of claim 10, wherein each of the waveform of the output current signal generated in response to the second set and the waveform of the output current signal generated in response to the third set has an initial portion that is substantially identical to an initial portion of the output current signal generated in response to the first set.

12. The circuit of claim 9, wherein each of the waveform of the output current signal generated in response to the first set, the waveform of the output current signal generated in response to the second set, and the waveform of the output current signal generated in response to the third set has a substantially identical initial portion.

13. The circuit of claim 1, wherein the controller includes:

a control block coupled to receive the data signal and configured to generate a different set of internal control bits in response to each said different one of the bit patterns; and a shift register circuit coupled to receive the internal control bits and a delayed version of the data signal, and configured to generate a first subset of each of said sets of binary control signals in response to each different set of the internal control bits and a portion of the delayed version of the data signal.

14. The circuit of claim 13, wherein the controller includes:

a second control block coupled to receive the data signal and configured to generate a different set of additional internal control bits in response to a subset of each said different one of the bit patterns; and a second shift register circuit coupled to receive the additional internal control bits and said delayed version of the data signal, and configured to generate a second subset of said each of said sets of binary control signals in response to each different set of the additional internal control bits and a portion of the delayed version of the data signal.

15. The circuit of claim 13, also including:

a phase-lock loop circuit coupled to the shift register circuit of the controller, and configured to assert at least one clock signal to said shift register circuit in response to an oscillator signal, wherein said shift register circuit operates in response to edges of each said clock signal having a single polarity only.

16. The circuit of claim 1, wherein said circuit is implemented as a single integrated circuit.

17. A waveshaping circuit for generating an output current signal in response to a data signal comprising bit patterns, the waveshaping circuit comprising:

a controller, coupled to receive the data signal and including logic circuitry configured to generate a first set of control signals in response to a first one of the bit patterns, a second set of control signals in response to a second one of the bit patterns, and a third set of control signals in response to a third one of the bit patterns; and a current summing circuit, coupled to the controller to receive any one of the first set, the second set, and the third set, and configured to assert the output current signal with a first waveform by sinking a sequence of currents determined by the first set, wherein each of the control signals in each of the first set, the second set, and the third the set has a sequence of values over time, and each of the currents in the sequence is determined by the values of the control signals of said first set in a different interval of time, to assert the output current signal with a second waveform by sinking a second sequence of currents determined by the second set, wherein each of the currents in the second sequence is determined by the values of the control signals of said second set in a different interval of time, and to assert the output current signal with a third waveform by sinking a third sequence of currents determined by the third set, wherein each of the currents in the third sequence is determined by the values of the control signals of said third set in a different interval of time, and wherein each of the first waveform, the second waveform, and the third waveform has a substantially identical, at least partially sinusoidal, initial portion.

18. The circuit of claim 17, wherein the first one of the bit patterns determines a square wave portion of frequency F of the data signal, the second one of the bit patterns determines a portion of frequency F/2 of the data signal, and the third one of the bit patterns is an end of packet code portion of the data signal.

19. The circuit of claim 18, wherein the third waveform has an end portion which undergoes a gradual final transition to an amplitude at least substantially equal to zero amplitude.

20. The circuit of claim 17, also including:

a phase-lock loop circuit coupled to the controller, and conigured to assert at least one clock signal to the controller in response to an oscillator signal, wherein the controller operates in response to edges of each said clock signal having a single polarity only.

21. The circuit of claim 20, wherein said edges are all rising edges.

22. The circuit of claim 17, wherein said circuit is implemented as a single integrated circuit.

23. A waveshaping circuit for generating an output current signal in response to a data signal comprising bit patterns, the waveshaping circuit comprising:

a phase-lock loop circuit configured to assert at least one clock signal in response to an oscillator signal;

a controller, coupled to receive the data signal and each said clock signal, and including logic circuitry configured to generate a first set of control signals in response to a first one of the bit patterns, a second set of control signals in response to a second one of the bit patterns, and a third set of control signals in response to a third one of the bit patterns, wherein said logic circuitry operates in response to edges of each said clock signal having a single polarity only; and a current summing circuit, coupled to the controller to receive any one of the first set, the second set, and the third set, and configured to assert the output current signal with a first waveform by sinking a sequence of currents determined by the first set, wherein each of the control signals in each of the first set, the second set, and the third the set has a sequence of values over time, and each of the currents in the sequence is determined by the values of the control signals of said first set in a different interval of time, to assert the output current signal with a second waveform by sinking a second sequence of currents determined by the second set, wherein each of the currents in the second sequence is determined by the values of the control signals of said second set in a different interval of time, and to assert the output current signal with a third waveform by sinking a third sequence of currents determined by the third set, wherein each of the currents in the third sequence is determined by the values of the control signals of said third set in a different interval of time.

24. The circuit of claim 23, wherein each of the first waveform, the second waveform, and the third waveform has a substantially identical, sinusoidal, initial portion.

25. The circuit of claim 23, wherein the first one of the bit patterns determines a square wave portion of frequency F of the data signal, the second one of the bit patterns determines a portion of frequency F/2 of the data signal, and the third one of the bit patterns is an end of packet code portion of the data signal.

26. The circuit of claim 25, wherein the third waveform has an end portion which undergoes a gradual final transition to an amplitude at least substantially equal to zero amplitude.

27. The circuit of claim 23, wherein said circuit is implemented as a single integrated circuit.

28. A system for generating an output signal having a predetermined transmit waveform, including:

a waveshaping circuit for generating a first output current signal and a second output current signal in response to a data signal comprising bit patterns, wherein the waveshaping circuit comprises a controller coupled to receive the data signal and configured to generate sets of control signals in response to the data signal, where each of the sets of control signals is generated in response to a different one of the bit patterns, and wherein the waveshaping circuit also comprises a current summing circuit coupled to the controller to receive the sets of control signals and configured to assert said first output current signal by sinking a sequence of currents determined by a subset of one of the sets of control signals and to assert said second output current signal by sinking another sequence of currents determined by another subset of said one of the sets of control signals; and a line driver circuit coupled to the current summing circuit to receive the first output current signal and the second output current signal, and configured to amplify and combine said first output current signal and said second output current signal to generate the output signal having the Predetermined transmit waveform.

29. The system of claim 28, wherein the output signal has a peak amplitude, and wherein the transmit waveform and the peak amplitude are such that the output signal is suitable for transmission over a twisted-pair cable of a local area network.

30. The system of claim 28, wherein the waveshaping circuit is implemented as a single integrated circuit.

31. The system of claim 28, wherein the controller includes:

a control block coupled to receive the data signal and configured to generate a different set of internal control bits in response to each said different one of the bit patterns; and a shift register circuit coupled to receive the internal control bits and a delayed version of the data signal, and configured to generate a first subset of each of said sets of control signals in response to each different set of the internal control bits and a portion of the delayed version of the data signal.

32. The system of claim 31, wherein the waveshaping circuit also includes:

a phase-lock loop circuit coupled to the controller, and configured to assert at least one clock signal to the shift register circuit in response to an oscillator signal, wherein the shift register circuit operates in response to edges of each said clock signal having a single polarity only.

\* \* \* \* \*

UNITED STATES PATENT AND TRADEMARK OFFICE
CERTIFICATE OF CORRECTION

PATENT NO.: 5,936,450
DATED: August 10, 1999
INVENTOR(S): Nathaniel W. Unger

It is certified that errors appear in the above-identified patent and that said Letters Patent is hereby corrected as shown below:

In Col. 23, line 52, delete "conigured" and replace with --configured--.

In Col. 24, line 65, delete "Predetermined" and replace with --predetermined--.

Signed and Sealed this

Seventh Day of December, 1999

*Attest:*

Q. TODD DICKINSON

*Attesting Officer*  Acting Commissioner of Patents and Trademarks